US012183358B2

(12) United States Patent
Vilkamo et al.

(10) Patent No.: US 12,183,358 B2
(45) Date of Patent: Dec. 31, 2024

(54) SOUND FIELD RELATED RENDERING

(71) Applicant: Nokia Technologies Oy, Espoo (FI)

(72) Inventors: Juha Vilkamo, Helsinki (FI); Koray Ozcan, Hampshire (GB); Mikko-Ville Laitinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 382 days.

(21) Appl. No.: 17/595,947

(22) PCT Filed: Jun. 3, 2020

(86) PCT No.: PCT/FI2020/050386
§ 371 (c)(1),
(2) Date: Nov. 30, 2021

(87) PCT Pub. No.: WO2020/249859
PCT Pub. Date: Dec. 17, 2020

(65) Prior Publication Data

US 2022/0328056 A1 Oct. 13, 2022

(30) Foreign Application Priority Data

Jun. 11, 2019 (GB) .................................... 1908343

(51) Int. Cl.
*G10L 21/0208* (2013.01)
*H04S 7/00* (2006.01)

(52) U.S. Cl.
CPC .......... *G10L 21/0208* (2013.01); *H04S 7/304* (2013.01); *H04S 2400/01* (2013.01)

(58) Field of Classification Search
CPC ....... G10L 21/0208; G10L 2021/02166; G10L 19/008; H04S 7/304; H04S 2400/01;
(Continued)

(56) References Cited

U.S. PATENT DOCUMENTS 4,527,203 A 7/1985 Kamai ......................... 360/19.1
2016/0299738 A1 10/2016 Makinen et al.
(Continued)

FOREIGN PATENT DOCUMENTS

CN 101843114 A 9/2010
CN 103325383 A 9/2013
(Continued)

OTHER PUBLICATIONS

3GPP TSG-SA4#102 meeting, Jan. 28-Feb. 1, 2019, Bruges, Belgium, S4-190121, "Proposal for MASA format", Nokia Corporation, 10 pgs.

(Continued)

*Primary Examiner* — Thierry L Pham
(74) *Attorney, Agent, or Firm* — McCarter & English, LLP

(57) ABSTRACT

An apparatus including circuitry configured to obtain a defocus direction; process a spatial audio signal that represents an audio scene to generate a processed spatial audio signal that represents a modified audio scene based on the defocus direction, so as to control relative deemphasis in, at least in part, a portion of the spatial audio signal in the defocus direction relative to at least in part other portions of the spatial audio signal; and output the processed spatial audio signal, wherein the modified audio scene based on the defocus direction enables the deemphasis in, at least in part, the portion of the spatial audio signal in the defocus direction relative to at least in part other portions of the spatial audio signal.

20 Claims, 19 Drawing Sheets

(58) Field of Classification Search
CPC ............. H04S 2400/11; H04S 2420/01; H04S 2420/11; H04S 7/30
USPC .......................................................... 704/226
See application file for complete search history.

(56) References Cited

U.S. PATENT DOCUMENTS

| | | | |
|---|---|---|---|
| 2016/0379660 A1 | 12/2016 | Wright et al. | |
| 2017/0180430 A1 | 6/2017 | Ahmed Assem Aly Salama et al. | |
| 2017/0230760 A1 | 8/2017 | Sanger et al. | 25/40 |
| 2017/0347219 A1 | 11/2017 | McCauley et al. | 7/304 |
| 2019/0069083 A1 | 2/2019 | Salehin et al. | |
| 2019/0174246 A1 | 6/2019 | De Bruijn et al. | |
| 2019/0313200 A1 | 10/2019 | Stein | |

FOREIGN PATENT DOCUMENTS

| | | | | |
|---|---|---|---|---|
| CN | 105637894 A | 6/2016 | | |
| EP | 2 613 564 A2 | 7/2013 | | |
| GB | 2549532 A | 10/2017 | | |
| JP | 2013514696 A | 4/2013 | | |
| JP | 2013207759 A | 10/2013 | | |
| JP | 2015198413 A | 11/2015 | | |
| JP | 2018534853 A | 11/2018 | | |
| WO | WO-2016109065 A1 * | 7/2016 | | G06F 3/165 |

OTHER PUBLICATIONS

Laitinen, Mikko-Ville, “Binaural Reproduction for Directional Audio Coding”, May 26, 2008, 74 pgs.

* cited by examiner

SOUND FIELD RELATED RENDERING

CROSS REFERENCE TO RELATED APPLICATION

This patent application is a U.S. National Stage application of International Patent Application Number PCT/FI2020/050386 filed Jun. 3, 2020, which is hereby incorporated by reference in its entirety, and claims priority to GB 1908343.5 filed Jun. 11, 2019.

FIELD

The present application relates to apparatus and methods for sound-field related audio representation and rendering, but not exclusively for audio representation for an audio decoder.

BACKGROUND

Spatial audio playback to present media with multiple viewing directions is known. Examples of this playback include the viewing visual content of such a media include playback with: on head-mounted displays (or phones in head mounts) with (at least) head orientation tracking; or on phone screen without a head-mount where the view direction can be tracked by changing the position/orientation of the phone, or by any user interface gestures; or on surrounding screens.

A video associated with "media with multiple viewing directions" can be for example 360-degree video, 180-degree video, or other video substantially wider in viewing angle than traditional video. Traditional video refers to video content typically displayed as whole on a screen without an option (or any particular need) to change the viewing direction.

Audio associated with the video with multiple viewing directions can be presented on headphones, where the viewing direction is tracked and is affecting the spatial audio playback, or with surround loudspeaker setups. Spatial audio that is associated with the video with multiple viewing directions can originate from spatial audio capture from microphone arrays (e.g., an array mounted on OZO-like VR camera, or a hand-held mobile device), or other sources such as studio mixes. The audio content can be also a mixture of several content types, such as microphone-captured sound and an added commentator track.

Spatial audio associated with the video with multiple viewing directions can be in various forms, for example: Ambisonic signal (of any order) consisting of spherical harmonic audio signal components. The spherical harmonics can be considered as a set of spatially selective beam signals. Ambisonics is utilized currently, e.g., in YouTube 360 VR video service. The advantage of Ambisonics is that it is a simple and well-defined signal representation; Surround loudspeaker signal, e.g., 5.1. Presently the spatial audio of typical movies is conveyed in this form. The advantage of a surround loudspeaker signal is the simplicity and legacy compatibility. Some audio formats similar to the surround loudspeaker signal format include audio objects, which can be considered as audio channels with a time-variant position. A position may inform both the direction and distance of the audio object, or the direction; Parametric spatial audio, such as two audio channels audio signal and associated spatial metadata in perceptually relevant frequency bands.

Some state-of-the-art audio coding methods and spatial audio capture methods apply such a signal representation. The spatial metadata essentially determines how the audio signals should be spatially reproduced at the receiver end (e.g. to which directions at different frequencies). The advantage of parametric spatial audio is its versatility, quality, and ability to use low bit rates for encoding.

SUMMARY

There is provided according to a first aspect an apparatus comprising means configured to: obtain a defocus direction; process a spatial audio signal that represents an audio scene to generate a processed spatial audio signal that represents a modified audio scene based on the defocus direction, so as to control relative deemphasis in, at least in part, a portion of the spatial audio signal in the defocus direction relative to at least in part other portions of the spatial audio signal; and output the processed spatial audio signal, wherein the modified audio scene based on the defocus direction enables the deemphasis in, at least in part, the portion of the spatial audio signal in the defocus direction relative to at least in part other portions of the spatial audio signal.

The means may be further configured to obtain a defocus amount, and wherein the means configured to process the spatial audio signal may be configured to control relative deemphasis in, at least in part, a portion of the spatial audio signal in the defocus direction relative to at least in part other portions of the spatial audio signal according to the defocus amount.

The means configured to process the spatial audio signal may be configured to perform at least one of: decrease emphasis in, at least in part, the portion of the spatial audio signal in the defocus direction relative to at least in part other portions of the spatial audio signal; and increase emphasis in, at least in part, other portions of the spatial audio signal relative to the portion of the spatial audio signal in the defocus direction.

The means configured to process the spatial audio signal may be configured to perform at least one of: decrease a sound level in, at least in part, the portion of the spatial audio signal in the defocus direction according to the defocus amount relative to at least in part other portions of the spatial audio signal; and increase a sound level in, at least in part, other portions of the spatial audio signal relative to the portion of the spatial audio signal in the defocus direction according to the defocus amount.

The means may be further configured to obtain a defocus shape, and wherein the means configured to process the spatial audio signal may be configured to control relative deemphasis in, at least in part, a portion of the spatial audio signal in the defocus direction and within the defocus shape relative to at least in part other portions of the spatial audio signal.

The means configured to process the spatial audio signal may be configured to perform at least one of: decrease emphasis in, at least in part, the portion of the spatial audio signal in the defocus direction and from within the defocus shape relative to at least in part other portions of the spatial audio signal; and increase emphasis in, at least in part, other portions of the spatial audio signal relative to the portion of the spatial audio signal in the defocus direction and within the defocus shape.

The means configured to process the spatial audio signal may be configured to perform at least one of: decrease a sound level in, at least in part, the portion of the spatial audio signal in the defocus direction and from within the defocus shape according to the defocus amount relative to at least in part other portions of the spatial audio signal; and increase a sound level in, at least in part, other portions of the spatial audio signal relative to the portion of the spatial audio signal in the defocus direction and from the defocus shape according to the defocus amount.

The means may be configured to: obtain reproduction control information to control at least one aspect of outputting the processed spatial audio signal, and wherein the means configured to output the processed spatial audio signal may be configured to perform one of: process the processed spatial audio signal that represents the modified audio scene based on the defocus direction to generate an output spatial audio signal in accordance with the reproduction control information; process the spatial audio signal in accordance with the reproduction control information prior to the means configured to process the spatial audio signal that represents an audio scene to generate the processed spatial audio signal that represents a modified audio scene based on the defocus direction and output the processed spatial audio signal as the output spatial audio signal.

The spatial audio signal and the processed spatial audio signal may comprise respective Ambisonic signals and wherein the means configured to process the spatial audio signal into the processed spatial audio signal may be configured, for one or more frequency sub-bands, to: extract, from the spatial audio signal, a single-channel target audio signal that represents the sound component arriving from the focus direction; generate, a focused spatial audio signal, where the focused audio signal is arranged in a spatial position defined by the defocus direction; and create the processed spatial audio signal as a linear combination of the focused spatial audio signal subtracted from the spatial audio signal, wherein at least one of the focused spatial audio signal and the spatial audio signal is scaled by a respective scaling factor derived on basis of the defocus amount to decrease a relative level of the sound in the defocus direction.

The means configured to extract the single channel target audio signal may be configured to: apply a beamformer to derive, from the spatial audio signal, a beamformed signal that represents the sound component arriving from the defocus direction; and apply a post filter to derive the processed audio signal on basis of the beamformed signal, thereby adjusting the spectrum of the beamformed signal to approximate the spectrum of the sound arriving from the defocus direction.

The spatial audio signal and the processed spatial audio signal may comprise respective first order Ambisonic signals.

The spatial audio signal and the processed spatial audio signal may comprise respective parametric spatial audio signals, wherein a parametric spatial audio signal may comprise one or more audio channels and spatial metadata, wherein the spatial metadata may comprise a respective direction indication and an energy ratio parameter for a plurality of frequency sub-bands, wherein the means configured to process the spatial audio signal to generate the processed spatial audio signal may be configured to: compute, for one or more frequency sub-bands, a respective angular difference between the defocus direction and the direction indicated for the respective frequency sub-band of the spatial audio signal; derive a respective gain value for the one or more frequency sub-bands on basis of the angular difference computed for the respective frequency sub-band by using a predefined function of angular difference and a scaling factor derived on basis of the defocus amount; compute, for one or more frequency sub-bands of the processed spatial audio signal, a respective updated directional energy value on basis of the energy ratio parameter of the respective frequency sub-band of the spatial audio signal and the gain value; compute, for the one or more frequency bands of the processed spatial audio signal, a respective updated ambient energy value on basis of the energy ratio parameter of the respective frequency sub-band of the spatial audio signal and the scaling factor; compute a respective modified energy ratio parameter for the one or more frequency sub-bands of the processed spatial audio signal on basis of the updated directional energy divided by the sum of the updated direct and ambient energies; compute a respective spectral adjustment factor for the one or more frequency sub-bands of the processed spatial audio signal on basis of the sum of the updated direct and ambient energies; and compose the processed spatial audio signal comprising the one or more audio channels of the spatial audio signal, the direction indications of the spatial audio signal, the modified energy ratio parameters, and the spectral adjustment factors.

The spatial audio signal and the processed spatial audio signal may comprise respective parametric spatial audio signals, wherein a parametric spatial audio signal may comprise one or more audio channels and spatial metadata, wherein the spatial metadata may comprise a respective direction indication and an energy ratio parameter for a plurality of frequency sub-bands, wherein the means configured to process the spatial audio signal to generate the processed spatial audio signal may be configured to: compute, for one or more frequency sub-bands, a respective angular difference between the defocus direction and the direction indicated for the respective frequency sub-band of the spatial audio signal; derive a respective gain value for the one or more frequency sub-bands on basis of the angular difference computed for the respective frequency sub-band by using a predefined function of angular difference and a scaling factor derived on basis of the defocus amount; compute, for one or more frequency sub-bands of the processed spatial audio signal, a respective updated directional energy value on basis of the energy ratio parameter of the respective frequency sub-band of the spatial audio signal and the gain value; compute, for the one or more frequency bands of the processed spatial audio signal, a respective updated ambient energy value on basis of the energy ratio parameter of the respective frequency sub-band of the spatial audio signal and the scaling factor; compute a respective modified energy ratio parameter for the one or more frequency sub-bands of the processed spatial audio signal on basis of the updated directional energy divided by the sum of the updated direct and ambient energies; compute a respective spectral adjustment factor for the one or more frequency sub-bands of the processed spatial audio signal on basis of the sum of the updated direct and ambient energies; derive in the one or more frequency sub-bands, one or more enhanced audio channels by multiplying the respective frequency band of a respective one of the one more audio channels of the spatial audio signal by the spectral adjustment factor derived for the respective frequency sub-band; and compose the processed spatial audio signal comprising the one or more enhanced audio channels, the direction indications of the spatial audio signal, and the modified energy ratio parameters.

The spatial audio signal and the processed spatial audio signal may comprise respective multi-channel loudspeaker signals according to a first predefined loudspeaker configuration, and wherein the means configured to process the spatial audio signal to generate the processed spatial audio signal may be configured to: compute a respective angular difference between the defocus direction and a loudspeaker direction indicated for a respective channel of the spatial audio signal; derive a respective gain value for each channel of the spatial audio signal on basis of the angular difference computed for the respective channel by using a predefined function of angular difference and a scaling factor derived on basis of the defocus amount; derive one or more modified audio channels by multiplying the respective channel of the spatial audio signal by the gain value derived for the respective channel; and provide the modified audio channels as the processed spatial audio signal.

The predefined function of angular difference may yield a gain value that decreases with decreasing value of angular difference and that increases with increasing value of angular difference.

The processed spatial audio signal may comprise an Ambisonic signal and the output spatial audio signal may comprise a two-channel binaural signal, wherein the reproduction control information may comprise an indication of a reproduction orientation that defines a listening direction with respect to the audio scene, and wherein the means configured to process the processed spatial audio signal that represents the modified audio scene based on the defocus direction to generate an output spatial audio signal in accordance with the reproduction control information may be configured to: generate a rotation matrix in dependence of the indicated reproduction orientation; multiply the channels of the processed spatial audio signal with the rotation matrix to derive the rotated spatial audio signal; filter the channels of the rotated spatial audio signal using a predefined set of finite impulse response, FIR, filter pairs generated on basis of a data set of head related impulse response functions, HRTFs, or head related impulse responses, HRIRs; and generate the left and right channels of the binaural signal as a sum of the filtered channels of the rotated spatial audio signal derived for the respective one of the left and right channels.

The output spatial audio signal may comprise a two-channel binaural audio signal, wherein the reproduction control information may comprise an indication of a reproduction orientation that defines a listening direction with respect to the audio scene, and the means configured to process the processed spatial audio signal that represents the modified audio scene based on the defocus direction to generate an output spatial audio signal in accordance with the reproduction control information may be configured to: derive, in said one or more frequency sub-bands, one or more enhanced audio channels by multiplying the respective frequency band of a respective one of the one more audio channels of the processed spatial audio signal by the spectral adjustment factor received for the respective frequency sub-band; and convert the one or more enhanced audio channels into the two-channel binaural audio signal in accordance with the indicated reproduction orientation.

The output spatial audio signal may comprise a two-channel binaural audio signal, wherein the reproduction control information may comprise an indication of a reproduction orientation that defines a listening direction with respect to the audio scene, and wherein the means configured to process the processed spatial audio signal that represents the modified audio scene based on the defocus direction to generate an output spatial audio signal in accordance with the reproduction control information may be configured to convert the one or more enhanced audio channels into the two-channel binaural audio signal in accordance with the indicated reproduction orientation.

The output spatial audio signal may comprise a two-channel binaural signal, wherein the reproduction control information may comprise an indication of a reproduction orientation that defines a listening direction with respect to the audio scene, and wherein the means configured to process the processed spatial audio signal that represents the modified audio scene based on the defocus direction to generate an output spatial audio signal in accordance with the reproduction control information may be configured to: select a set of head related transfer functions, HRTFs, in dependence of the indicated reproduction orientation; and convert channels of the processed spatial audio signal into the two-channel binaural signal that conveys the rotated audio scene using the selected set of HRTFs.

The reproduction control information may comprise an indication of a second predefined loudspeaker configuration and the output spatial audio signal may comprise a multi-channel loudspeaker signals according to the second predefined loudspeaker configuration, and wherein the means configured to process the processed spatial audio signal that represents the modified audio scene based on the defocus direction to generate an output spatial audio signal in accordance with the reproduction control information may be configured to: derive channels of the output spatial audio signal on basis of channels of the processed spatial audio signal using amplitude panning, by being configured to derive a conversion matrix including amplitude panning gains that provide the mapping from the first predefined loudspeaker configuration to the second predefined loudspeaker configuration and use the conversion matrix to multiply channels of the processed spatial audio signal into channels of the output spatial audio signal.

The means may be further configured to: obtain a defocus input from a sensor arrangement that comprises at least one direction sensor and at least one user input, wherein the defocus input may comprise an indication of the defocus direction based on the at least one direction sensor direction.

The defocus input may further comprise an indicator of the defocus amount.

The defocus input may further comprise an indicator of the defocus shape.

The defocus shape may comprise at least one of: a defocus shape width; a defocus shape height; a defocus shape radius; a defocus shape distance; a defocus shape depth; a defocus shape range; a defocus shape diameter; and a defocus shape characterizer.

The defocus direction may be an arc defined by a range of defocus directions.

According to a second aspect there is provided a method comprising:

obtaining a defocus direction; processing a spatial audio signal that represents an audio scene to generate a processed spatial audio signal that represents a modified audio scene based on the defocus direction, so as to control relative deemphasis in, at least in part, a portion of the spatial audio signal in the defocus direction relative to at least in part other portions of the spatial audio signal; and outputting the processed spatial audio signal, wherein the modified audio scene based on the defocus direction enables the deemphasis in, at least in part, the portion of the spatial audio signal in the defocus direction relative to at least in part other portions of the spatial audio signal.

The method may further comprise obtaining a defocus amount, and wherein processing the spatial audio signal may comprise controlling relative deemphasis in, at least in part, a portion of the spatial audio signal in the defocus direction relative to at least in part other portions of the spatial audio signal according to the defocus amount.

Processing the spatial audio signal may comprise at least one of: decreasing emphasis in, at least in part, the portion of the spatial audio signal in the defocus direction relative to at least in part other portions of the spatial audio signal; and increasing emphasis in, at least in part, other portions of the spatial audio signal relative to the portion of the spatial audio signal in the defocus direction.

Processing the spatial audio signal may comprise at least one of: decreasing a sound level in, at least in part, the portion of the spatial audio signal in the defocus direction according to the defocus amount relative to at least in part other portions of the spatial audio signal; and increasing a sound level in, at least in part, other portions of the spatial audio signal relative to the portion of the spatial audio signal in the defocus direction according to the defocus amount.

The method may further comprise obtaining a defocus shape, and wherein processing the spatial audio signal may comprise controlling relative deemphasis in, at least in part, a portion of the spatial audio signal in the defocus direction and within the defocus shape relative to at least in part other portions of the spatial audio signal.

Processing the spatial audio signal may comprise at least one of: decreasing emphasis in, at least in part, the portion of the spatial audio signal in the defocus direction and from within the defocus shape relative to at least in part other portions of the spatial audio signal; and increasing emphasis in, at least in part, other portions of the spatial audio signal relative to the portion of the spatial audio signal in the defocus direction and within the defocus shape.

Processing the spatial audio signal may comprise at least one of: decreasing a sound level in, at least in part, the portion of the spatial audio signal in the defocus direction and from within the defocus shape according to the defocus amount relative to at least in part other portions of the spatial audio signal; and increasing a sound level in, at least in part, other portions of the spatial audio signal relative to the portion of the spatial audio signal in the defocus direction and from the defocus shape according to the defocus amount.

The method may comprise obtaining reproduction control information to control at least one aspect of outputting the processed spatial audio signal, and wherein outputting the processed spatial audio signal may comprise one of: processing the processed spatial audio signal that represents the modified audio scene based on the defocus direction to generate an output spatial audio signal in accordance with the reproduction control information; processing the spatial audio signal in accordance with the reproduction control information prior to the processing the spatial audio signal that represents an audio scene to generate the processed spatial audio signal that represents a modified audio scene based on the defocus direction and outputting the processed spatial audio signal as the output spatial audio signal.

The spatial audio signal and the processed spatial audio signal may comprise respective Ambisonic signals and wherein processing the spatial audio signal into the processed spatial audio signal may comprise, for one or more frequency sub-bands: extracting, from the spatial audio signal, a single-channel target audio signal that represents the sound component arriving from the focus direction; generating, a focused spatial audio signal, where the focused audio signal is arranged in a spatial position defined by the defocus direction; and creating the processed spatial audio signal as a linear combination of the focused spatial audio signal subtracted from the spatial audio signal, wherein at least one of the focused spatial audio signal and the spatial audio signal is scaled by a respective scaling factor derived on basis of the defocus amount to decrease a relative level of the sound in the defocus direction.

Extracting the single channel target audio signal may comprise: applying a beamformer to derive, from the spatial audio signal, a beamformed signal that represents the sound component arriving from the defocus direction; and applying a post filter to derive the processed audio signal on basis of the beamformed signal, thereby adjusting the spectrum of the beamformed signal to approximate the spectrum of the sound arriving from the defocus direction.

The spatial audio signal and the processed spatial audio signal may comprise respective first order Ambisonic signals.

The spatial audio signal and the processed spatial audio signal may comprise respective parametric spatial audio signals, wherein a parametric spatial audio signal may comprise one or more audio channels and spatial metadata, wherein the spatial metadata may comprise a respective direction indication and an energy ratio parameter for a plurality of frequency sub-bands, wherein processing the spatial audio signal to generate the processed spatial audio signal may comprise: computing, for one or more frequency sub-bands, a respective angular difference between the defocus direction and the direction indicated for the respective frequency sub-band of the spatial audio signal; deriving a respective gain value for the one or more frequency sub-bands on basis of the angular difference computed for the respective frequency sub-band by using a predefined function of angular difference and a scaling factor derived on basis of the defocus amount; computing, for one or more frequency sub-bands of the processed spatial audio signal, a respective updated directional energy value on basis of the energy ratio parameter of the respective frequency sub-band of the spatial audio signal and the gain value; computing, for the one or more frequency bands of the processed spatial audio signal, a respective updated ambient energy value on basis of the energy ratio parameter of the respective frequency sub-band of the spatial audio signal and the scaling factor; computing a respective modified energy ratio parameter for the one or more frequency sub-bands of the processed spatial audio signal on basis of the updated directional energy divided by the sum of the updated direct and ambient energies; computing a respective spectral adjustment factor for the one or more frequency sub-bands of the processed spatial audio signal on basis of the sum of the updated direct and ambient energies; and composing the processed spatial audio signal comprising the one or more audio channels of the spatial audio signal, the direction indications of the spatial audio signal, the modified energy ratio parameters, and the spectral adjustment factors.

The spatial audio signal and the processed spatial audio signal may comprise respective parametric spatial audio signals, wherein a parametric spatial audio signal may comprise one or more audio channels and spatial metadata, wherein the spatial metadata may comprise a respective direction indication and an energy ratio parameter for a plurality of frequency sub-bands, wherein processing the spatial audio signal to generate the processed spatial audio signal may comprise: computing, for one or more frequency sub-bands, a respective angular difference between the defocus direction and the direction indicated for the respective frequency sub-band of the spatial audio signal; deriving a respective gain value for the one or more frequency sub-bands on basis of the angular difference computed for the respective frequency sub-band by using a predefined function of angular difference and a scaling factor derived on basis of the defocus amount; computing, for one or more frequency sub-bands of the processed spatial audio signal, a respective updated directional energy value on basis of the energy ratio parameter of the respective frequency sub-band of the spatial audio signal and the gain value; computing, for the one or more frequency bands of the processed spatial audio signal, a respective updated ambient energy value on basis of the energy ratio parameter of the respective frequency sub-band of the spatial audio signal and the scaling factor; computing a respective modified energy ratio parameter for the one or more frequency sub-bands of the processed spatial audio signal on basis of the updated directional energy divided by the sum of the updated direct and ambient energies; computing a respective spectral adjustment factor for the one or more frequency sub-bands of the processed spatial audio signal on basis of the sum of the updated direct and ambient energies; deriving in the one or more frequency sub-bands, one or more enhanced audio channels by multiplying the respective frequency band of a respective one of the one more audio channels of the spatial audio signal by the spectral adjustment factor derived for the respective frequency sub-band; and composing the processed spatial audio signal comprising the one or more enhanced audio channels, the direction indications of the spatial audio signal, and the modified energy ratio parameters.

The spatial audio signal and the processed spatial audio signal may comprise respective multi-channel loudspeaker signals according to a first predefined loudspeaker configuration, and wherein processing the spatial audio signal to generate the processed spatial audio signal may comprise: computing a respective angular difference between the defocus direction and a loudspeaker direction indicated for a respective channel of the spatial audio signal; deriving a respective gain value for each channel of the spatial audio signal on basis of the angular difference computed for the respective channel by using a predefined function of angular difference and a scaling factor derived on basis of the defocus amount; deriving one or more modified audio channels by multiplying the respective channel of the spatial audio signal by the gain value derived for the respective channel; and providing the modified audio channels as the processed spatial audio signal.

The predefined function of angular difference may yield a gain value that decreases with decreasing value of angular difference and that increases with increasing value of angular difference.

The processed spatial audio signal may comprise an Ambisonic signal and the output spatial audio signal may comprise a two-channel binaural signal, wherein the reproduction control information may comprise an indication of a reproduction orientation that defines a listening direction with respect to the audio scene, and wherein processing the processed spatial audio signal that represents the modified audio scene based on the defocus direction to generate an output spatial audio signal in accordance with the reproduction control information may comprise: generating a rotation matrix in dependence of the indicated reproduction orientation; multiplying the channels of the processed spatial audio signal with the rotation matrix to derive the rotated spatial audio signal; filtering the channels of the rotated spatial audio signal using a predefined set of finite impulse response, FIR, filter pairs generated on basis of a data set of head related impulse response functions, HRTFs, or head related impulse responses, HRIRs; and generating the left and right channels of the binaural signal as a sum of the filtered channels of the rotated spatial audio signal derived for the respective one of the left and right channels.

The output spatial audio signal may comprise a two-channel binaural audio signal, wherein the reproduction control information may comprise an indication of a reproduction orientation that defines a listening direction with respect to the audio scene, and processing the processed spatial audio signal that represents the modified audio scene based on the defocus direction to generate an output spatial audio signal in accordance with the reproduction control information may comprise:

deriving, in said one or more frequency sub-bands, one or more enhanced audio channels by multiplying the respective frequency band of a respective one of the one more audio channels of the processed spatial audio signal by the spectral adjustment factor received for the respective frequency sub-band; and converting the one or more enhanced audio channels into the two-channel binaural audio signal in accordance with the indicated reproduction orientation.

The output spatial audio signal may comprise a two-channel binaural audio signal, wherein the reproduction control information may comprise an indication of a reproduction orientation that defines a listening direction with respect to the audio scene, and wherein processing the processed spatial audio signal that represents the modified audio scene based on the defocus direction to generate an output spatial audio signal in accordance with the reproduction control information may comprise converting the one or more enhanced audio channels into the two-channel binaural audio signal in accordance with the indicated reproduction orientation.

The output spatial audio signal may comprise a two-channel binaural signal, wherein the reproduction control information may comprise an indication of a reproduction orientation that defines a listening direction with respect to the audio scene, and wherein processing the processed spatial audio signal that represents the modified audio scene based on the defocus direction to generate an output spatial audio signal in accordance with the reproduction control information may comprise: selecting a set of head related transfer functions, HRTFs, in dependence of the indicated reproduction orientation; and converting channels of the processed spatial audio signal into the two-channel binaural signal that conveys the rotated audio scene using the selected set of HRTFs.

The reproduction control information may comprise an indication of a second predefined loudspeaker configuration and the output spatial audio signal may comprise a multi-channel loudspeaker signals according to the second predefined loudspeaker configuration, and wherein processing the processed spatial audio signal that represents the modified audio scene based on the defocus direction to generate an output spatial audio signal in accordance with the reproduction control information may comprise: deriving channels of the output spatial audio signal on basis of channels of the processed spatial audio signal using amplitude panning, by being configured to derive a conversion matrix including amplitude panning gains that provide the mapping from the first predefined loudspeaker configuration to the second predefined loudspeaker configuration and using the conversion matrix to multiply channels of the processed spatial audio signal into channels of the output spatial audio signal.

The method may further comprise: obtaining a defocus input from a sensor arrangement that comprises at least one direction sensor and at least one user input, wherein the defocus input may comprise an indication of the defocus direction based on the at least one direction sensor direction.

The defocus input may further comprise an indicator of the defocus amount.

The defocus input may further comprise an indicator of the defocus shape.

The defocus shape may comprise at least one of: a defocus shape width; a defocus shape height; a defocus shape radius; a defocus shape distance; a defocus shape depth; a defocus shape range; a defocus shape diameter; and a defocus shape characterizer.

The defocus direction may be an arc defined by a range of defocus directions.

According to a third aspect there is provided an apparatus comprising at least one processor and at least one memory including a computer program code, the at least one memory and the computer program code configured to, with the at least one processor, cause the apparatus at least to: obtain a defocus direction; process a spatial audio signal that represents an audio scene to generate a processed spatial audio signal that represents a modified audio scene based on the defocus direction, so as to control relative deemphasis in, at least in part, a portion of the spatial audio signal in the defocus direction relative to at least in part other portions of the spatial audio signal; and output the processed spatial audio signal, wherein the modified audio scene based on the defocus direction enables the deemphasis in, at least in part, the portion of the spatial audio signal in the defocus direction relative to at least in part other portions of the spatial audio signal.

The apparatus may be further caused to obtain a defocus amount, and wherein the apparatus caused to process the spatial audio signal may be caused to control relative deemphasis in, at least in part, a portion of the spatial audio signal in the defocus direction relative to at least in part other portions of the spatial audio signal according to the defocus amount.

The apparatus caused to process the spatial audio signal may caused to perform at least one of: decrease emphasis in, at least in part, the portion of the spatial audio signal in the defocus direction relative to at least in part other portions of the spatial audio signal; and increase emphasis in, at least in part, other portions of the spatial audio signal relative to the portion of the spatial audio signal in the defocus direction.

The apparatus caused to process the spatial audio signal may be caused to perform at least one of: decrease a sound level in, at least in part, the portion of the spatial audio signal in the defocus direction according to the defocus amount relative to at least in part other portions of the spatial audio signal; and increase a sound level in, at least in part, other portions of the spatial audio signal relative to the portion of the spatial audio signal in the defocus direction according to the defocus amount.

The apparatus may be further caused to obtain a defocus shape, and wherein the apparatus caused to process the spatial audio signal may be caused to control relative deemphasis in, at least in part, a portion of the spatial audio signal in the defocus direction and within the defocus shape relative to at least in part other portions of the spatial audio signal.

The apparatus caused to process the spatial audio signal may be caused to perform at least one of: decrease emphasis in, at least in part, the portion of the spatial audio signal in the defocus direction and from within the defocus shape relative to at least in part other portions of the spatial audio signal; and increase emphasis in, at least in part, other portions of the spatial audio signal relative to the portion of the spatial audio signal in the defocus direction and within the defocus shape.

The apparatus caused to process the spatial audio signal may be caused to perform at least one of: decrease a sound level in, at least in part, the portion of the spatial audio signal in the defocus direction and from within the defocus shape according to the defocus amount relative to at least in part other portions of the spatial audio signal; and increase a sound level in, at least in part, other portions of the spatial audio signal relative to the portion of the spatial audio signal in the defocus direction and from the defocus shape according to the defocus amount.

The apparatus may be caused to obtain reproduction control information to control at least one aspect of outputting the processed spatial audio signal, and wherein the apparatus caused to output the processed spatial audio signal may be caused to perform one of: process the processed spatial audio signal that represents the modified audio scene based on the defocus direction to generate an output spatial audio signal in accordance with the reproduction control information; process the spatial audio signal in accordance with the reproduction control information prior to the processing of the spatial audio signal that represents an audio scene to generate the processed spatial audio signal that represents a modified audio scene based on the defocus direction and output the processed spatial audio signal as the output spatial audio signal.

The spatial audio signal and the processed spatial audio signal may comprise respective Ambisonic signals and wherein the apparatus caused to process the spatial audio signal into the processed spatial audio signal may be caused, for one or more frequency sub-bands, to: extract, from the spatial audio signal, a single-channel target audio signal that represents the sound component arriving from the focus direction; generate, a focused spatial audio signal, where the focused audio signal is arranged in a spatial position defined by the defocus direction; and create the processed spatial audio signal as a linear combination of the focused spatial audio signal subtracted from the spatial audio signal, wherein at least one of the focused spatial audio signal and the spatial audio signal is scaled by a respective scaling factor derived on basis of the defocus amount to decrease a relative level of the sound in the defocus direction.

The apparatus caused to extract the single channel target audio signal may be caused to: apply a beamformer to derive, from the spatial audio signal, a beamformed signal that represents the sound component arriving from the defocus direction; and apply a post filter to derive the processed audio signal on basis of the beamformed signal, thereby adjusting the spectrum of the beamformed signal to approximate the spectrum of the sound arriving from the defocus direction.

The spatial audio signal and the processed spatial audio signal may comprise respective first order Ambisonic signals.

The spatial audio signal and the processed spatial audio signal may comprise respective parametric spatial audio signals, wherein a parametric spatial audio signal may comprise one or more audio channels and spatial metadata, wherein the spatial metadata may comprise a respective direction indication and an energy ratio parameter for a plurality of frequency sub-bands, wherein the apparatus caused to process the spatial audio signal to generate the processed spatial audio signal may be caused to: compute, for one or more frequency sub-bands, a respective angular difference between the defocus direction and the direction indicated for the respective frequency sub-band of the spatial audio signal; derive a respective gain value for the one or more frequency sub-bands on basis of the angular difference computed for the respective frequency sub-band by using a predefined function of angular difference and a scaling factor derived on basis of the defocus amount; compute, for one or more frequency sub-bands of the processed spatial audio signal, a respective updated directional energy value on basis of the energy ratio parameter of the respective frequency sub-band of the spatial audio signal and the gain value; compute, for the one or more frequency bands of the processed spatial audio signal, a respective updated ambient energy value on basis of the energy ratio parameter of the respective frequency sub-band of the spatial audio signal and the scaling factor; compute a respective modified energy ratio parameter for the one or more frequency sub-bands of the processed spatial audio signal on basis of the updated directional energy divided by the sum of the updated direct and ambient energies; compute a respective spectral adjustment factor for the one or more frequency sub-bands of the processed spatial audio signal on basis of the sum of the updated direct and ambient energies; and compose the processed spatial audio signal comprising the one or more audio channels of the spatial audio signal, the direction indications of the spatial audio signal, the modified energy ratio parameters, and the spectral adjustment factors.

The spatial audio signal and the processed spatial audio signal may comprise respective parametric spatial audio signals, wherein a parametric spatial audio signal may comprise one or more audio channels and spatial metadata, wherein the spatial metadata may comprise a respective direction indication and an energy ratio parameter for a plurality of frequency sub-bands, wherein the apparatus caused to process the spatial audio signal to generate the processed spatial audio signal may be caused to: compute, for one or more frequency sub-bands, a respective angular difference between the defocus direction and the direction indicated for the respective frequency sub-band of the spatial audio signal; derive a respective gain value for the one or more frequency sub-bands on basis of the angular difference computed for the respective frequency sub-band by using a predefined function of angular difference and a scaling factor derived on basis of the defocus amount; compute, for one or more frequency sub-bands of the processed spatial audio signal, a respective updated directional energy value on basis of the energy ratio parameter of the respective frequency sub-band of the spatial audio signal and the gain value; compute, for the one or more frequency bands of the processed spatial audio signal, a respective updated ambient energy value on basis of the energy ratio parameter of the respective frequency sub-band of the spatial audio signal and the scaling factor; compute a respective modified energy ratio parameter for the one or more frequency sub-bands of the processed spatial audio signal on basis of the updated directional energy divided by the sum of the updated direct and ambient energies; compute a respective spectral adjustment factor for the one or more frequency sub-bands of the processed spatial audio signal on basis of the sum of the updated direct and ambient energies; derive in the one or more frequency sub-bands, one or more enhanced audio channels by multiplying the respective frequency band of a respective one of the one more audio channels of the spatial audio signal by the spectral adjustment factor derived for the respective frequency sub-band; and compose the processed spatial audio signal comprising the one or more enhanced audio channels, the direction indications of the spatial audio signal, and the modified energy ratio parameters.

The spatial audio signal and the processed spatial audio signal may comprise respective multi-channel loudspeaker signals according to a first predefined loudspeaker configuration, and wherein the apparatus caused to process the spatial audio signal to generate the processed spatial audio signal may be caused to: compute a respective angular difference between the defocus direction and a loudspeaker direction indicated for a respective channel of the spatial audio signal; derive a respective gain value for each channel of the spatial audio signal on basis of the angular difference computed for the respective channel by using a predefined function of angular difference and a scaling factor derived on basis of the defocus amount; derive one or more modified audio channels by multiplying the respective channel of the spatial audio signal by the gain value derived for the respective channel; and provide the modified audio channels as the processed spatial audio signal.

The predefined function of angular difference may yield a gain value that decreases with decreasing value of angular difference and that increases with increasing value of angular difference.

The processed spatial audio signal may comprise an Ambisonic signal and the output spatial audio signal may comprise a two-channel binaural signal, wherein the reproduction control information may comprise an indication of a reproduction orientation that defines a listening direction with respect to the audio scene, and wherein the apparatus caused to process the processed spatial audio signal that represents the modified audio scene based on the defocus direction to generate an output spatial audio signal in accordance with the reproduction control information may be caused to: generate a rotation matrix in dependence of the indicated reproduction orientation; multiply the channels of the processed spatial audio signal with the rotation matrix to derive the rotated spatial audio signal; filter the channels of the rotated spatial audio signal using a predefined set of finite impulse response, FIR, filter pairs generated on basis of a data set of head related impulse response functions, HRTFs, or head related impulse responses, HRIRs; and generate the left and right channels of the binaural signal as a sum of the filtered channels of the rotated spatial audio signal derived for the respective one of the left and right channels.

The output spatial audio signal may comprise a two-channel binaural audio signal, wherein the reproduction control information may comprise an indication of a reproduction orientation that defines a listening direction with respect to the audio scene, and the apparatus caused to process the processed spatial audio signal that represents the modified audio scene based on the defocus direction to generate an output spatial audio signal in accordance with the reproduction control information may be caused to: derive, in said one or more frequency sub-bands, one or more enhanced audio channels by multiplying the respective frequency band of a respective one of the one more audio channels of the processed spatial audio signal by the spectral adjustment factor received for the respective frequency sub-band; and convert the one or more enhanced audio channels into the two-channel binaural audio signal in accordance with the indicated reproduction orientation.

The output spatial audio signal may comprise a two-channel binaural audio signal, wherein the reproduction control information may comprise an indication of a reproduction orientation that defines a listening direction with respect to the audio scene, and wherein the apparatus caused to process the processed spatial audio signal that represents the modified audio scene based on the defocus direction to generate an output spatial audio signal in accordance with the reproduction control information may be caused to convert the one or more enhanced audio channels into the two-channel binaural audio signal in accordance with the indicated reproduction orientation.

The output spatial audio signal may comprise a two-channel binaural signal, wherein the reproduction control information may comprise an indication of a reproduction orientation that defines a listening direction with respect to the audio scene, and wherein the apparatus caused to process the processed spatial audio signal that represents the modified audio scene based on the defocus direction to generate an output spatial audio signal in accordance with the reproduction control information may be caused to: select a set of head related transfer functions, HRTFs, in dependence of the indicated reproduction orientation; and convert channels of the processed spatial audio signal into the two-channel binaural signal that conveys the rotated audio scene using the selected set of HRTFs.

The reproduction control information may comprise an indication of a second predefined loudspeaker configuration and the output spatial audio signal may comprise a multi-channel loudspeaker signals according to the second predefined loudspeaker configuration, and wherein the means caused to process the processed spatial audio signal that represents the modified audio scene based on the defocus direction to generate an output spatial audio signal in accordance with the reproduction control information may be caused to: derive channels of the output spatial audio signal on basis of channels of the processed spatial audio signal using amplitude panning, by being configured to derive a conversion matrix including amplitude panning gains that provide the mapping from the first predefined loudspeaker configuration to the second predefined loudspeaker configuration and use the conversion matrix to multiply channels of the processed spatial audio signal into channels of the output spatial audio signal.

The apparatus may be further caused to: obtain a defocus input from a sensor arrangement that comprises at least one direction sensor and at least one user input, wherein the defocus input may comprise an indication of the defocus direction based on the at least one direction sensor direction.

The defocus input may further comprise an indicator of the defocus amount.

The defocus input may further comprise an indicator of the defocus shape.

The defocus shape may comprise at least one of: a defocus shape width; a defocus shape height; a defocus shape radius; a defocus shape distance; a defocus shape depth; a defocus shape range; a defocus shape diameter; and a defocus shape characterizer.

The defocus direction may be an arc defined by a range of defocus directions.

According to a fourth aspect there is provided an apparatus comprising obtaining circuitry configured to obtain a defocus direction; spatial audio signal processing circuitry configured to process a spatial audio signal that represents an audio scene to generate a processed spatial audio signal that represents a modified audio scene based on the defocus direction, so as to control relative deemphasis in, at least in part, a portion of the spatial audio signal in the defocus direction relative to at least in part other portions of the spatial audio signal; and outputting circuitry configured to control an output of the processed spatial audio signal, wherein the modified audio scene based on the defocus direction enables the deemphasis in, at least in part, the portion of the spatial audio signal in the defocus direction relative to at least in part other portions of the spatial audio signal.

According to a fifth aspect there is provided a computer program comprising instructions [or a computer readable medium comprising program instructions] for causing an apparatus to perform at least the following: obtaining a defocus direction; processing a spatial audio signal that represents an audio scene to generate a processed spatial audio signal that represents a modified audio scene based on the defocus direction, so as to control relative deemphasis in, at least in part, a portion of the spatial audio signal in the defocus direction relative to at least in part other portions of the spatial audio signal; and outputting the processed spatial audio signal, wherein the modified audio scene based on the defocus direction enables the deemphasis in, at least in part, the portion of the spatial audio signal in the defocus direction relative to at least in part other portions of the spatial audio signal.

According to a sixth aspect there is provided a non-transitory computer readable medium comprising program instructions for causing an apparatus to perform at least the following: obtaining a defocus direction; processing a spatial audio signal that represents an audio scene to generate a processed spatial audio signal that represents a modified audio scene based on the defocus direction, so as to control relative deemphasis in, at least in part, a portion of the spatial audio signal in the defocus direction relative to at least in part other portions of the spatial audio signal; and outputting the processed spatial audio signal, wherein the modified audio scene based on the defocus direction enables the deemphasis in, at least in part, the portion of the spatial audio signal in the defocus direction relative to at least in part other portions of the spatial audio signal.

According to a seventh aspect there is provided an apparatus comprising: means for obtaining a defocus direction; means for processing a spatial audio signal that represents an audio scene to generate a processed spatial audio signal that represents a modified audio scene based on the defocus direction, so as to control relative deemphasis in, at least in part, a portion of the spatial audio signal in the defocus direction relative to at least in part other portions of the spatial audio signal; and means for outputting the processed spatial audio signal, wherein the modified audio scene based on the defocus direction enables the deemphasis in, at least in part, the portion of the spatial audio signal in the defocus direction relative to at least in part other portions of the spatial audio signal.

According to an eighth aspect there is provided a computer readable medium comprising program instructions for causing an apparatus to perform at least the following: obtaining a defocus direction; processing a spatial audio signal that represents an audio scene to generate a processed spatial audio signal that represents a modified audio scene based on the defocus direction, so as to control relative deemphasis in, at least in part, a portion of the spatial audio signal in the defocus direction relative to at least in part other portions of the spatial audio signal;

and outputting the processed spatial audio signal, wherein the modified audio scene based on the defocus direction enables the deemphasis in, at least in part, the portion of the spatial audio signal in the defocus direction relative to at least in part other portions of the spatial audio signal.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for the provision of efficient rendering and playback of spatial audio signals.

Previous spatial audio signal playback examples allow the user to control the focus direction and the focus amount. However, in some situations, such control of the focus direction/amount may not be sufficient. The concept as discussed hereafter is apparatus and methods which feature further focus control which can indicate eliminating or de-emphasizing sounds in certain directions. For example in a sound field, there may be a number of different features such as multiple dominant sound sources in certain directions as well as ambient sounds. Some users may prefer to remove certain features of the sound field whereas some others may prefer to hear the complete audio scene, or to remove alternative features of the sound field. In particular, the users may wish to remove the undesired sounds in such a way that the remaining of the spatial sound scene is reproduced as originally intended.

The FIGS. 1*a* to 1*c* described in the following illustrate what a user is intended to perceive in listening to a reproduced spatial audio signal.

Figure 1A:
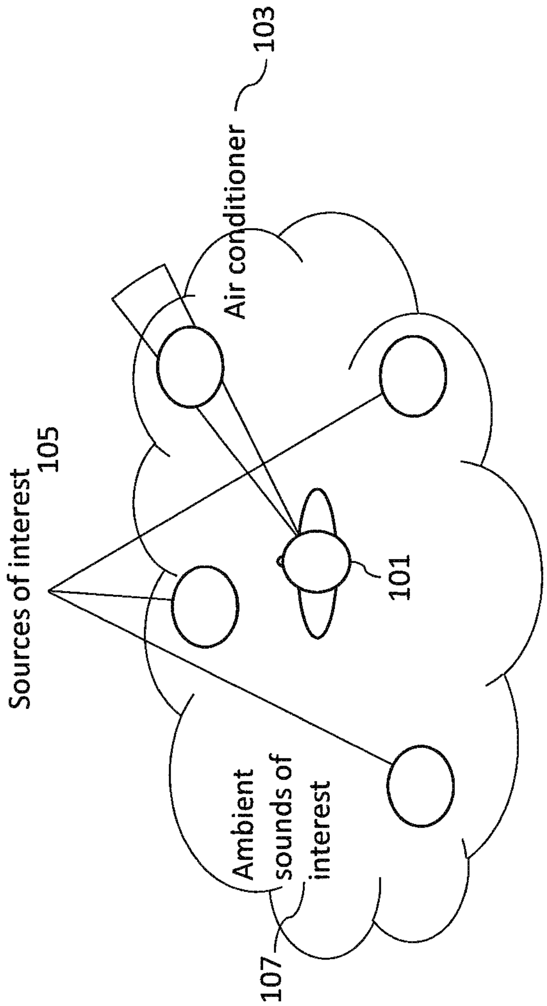
FIGS. 1*a*, 1*b* and 1*c* show example sound scenes showing audio focus regions or areas.

As an example, FIG. 1*a* shows a user 101 who is located with a defined orientation. Within the audio scene there are sources of interest 105, for example talkers. Furthermore there may be other ambient audio content 107 which are surrounding the user.

Moreover, the user may identify an interfering audio source, such as air conditioner 103. Conventionally a user may control the playback to focus on the sources of interest 105 to emphasize these over the interference source 103. However the concept as discussed in the embodiments attempts to improve the sound quality instead by performing a "remove" (or defocus or negative-focus) of an identified source or sources as indicated in FIG. 1*a* by the defocus or negative-focus identified source 103.

Figure 1B:
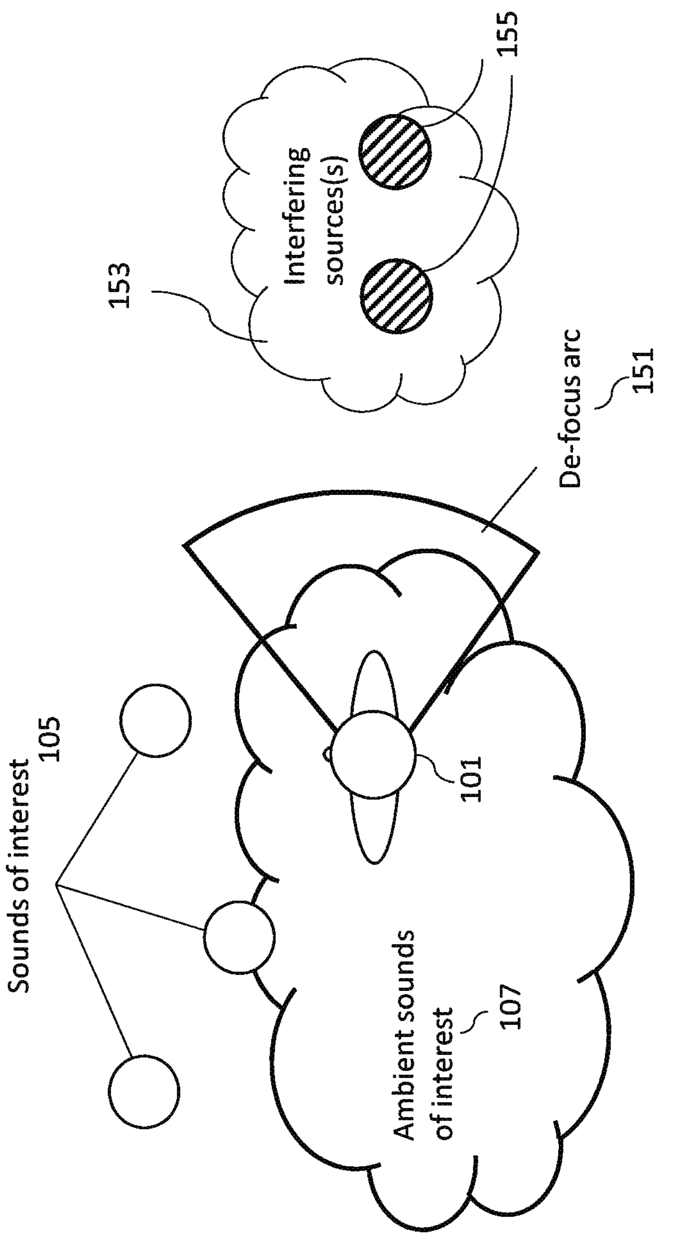

As another example as shown in FIG. 1*b* the user may wish to defocus or negative-focus any sources within a shape or region within the sound scene. Thus for example FIG. 1*b* shows the user 101 located with a defined orientation within the audio or sound scene with the sources of interest 105 for example talkers, the other ambient audio content 107 such as environmental audio content and interfering sources 155 within a defined region 153. In this example the region of defocus or negative-focus is represented by a defocus arc 151 of defined width and direction relative to the user 101. The defocus arc 151 of defined width and direction relative to the user 101 covers the interfering sources 155 within the interference source region 153.

Figure 1C:
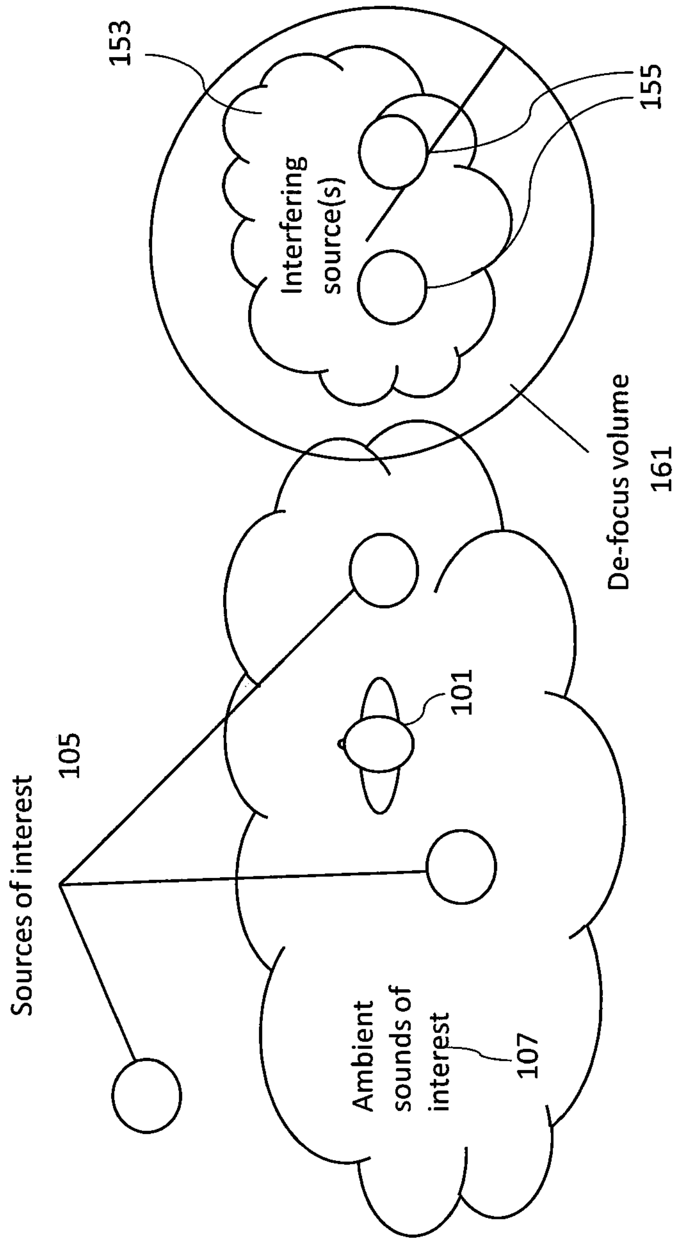

A further manner in which the region of defocus or negative-focus can be represented by is shown in FIG. 1*c* wherein a defocus region or volume (for a 3D region) 161 covers the interfering sources 155 within the interference source region 153. In this example the defocus region may be defined by distance as well as direction and 'width'.

Hence, the embodiments as discussed herein attempt to provide control of a defocus shape (in addition to the defocus direction and amount). The concept as discussed with respect to the embodiments described herein relates to spatial audio reproduction and enables an audio playback with control means for decreasing/eliminating/removing audio element(s) originating from selectable spatial direction(s) (or area(s) or volume(s)) with respect to element(s) outside these determined defocus shapes by a desired amount (e.g., 0%-100%) so as to de-emphasize audibility of the audio element(s) in selected spatial direction(s) (or area(s) or volume(s)) whilst maintaining audibility of desired audio elements in unselected spatial directions (or area(s) or volume(s)), while enabling also the spatial audio signal format to be the same.

The embodiments provide at least one defocus (or negative-focus) parameter corresponding to a selectable direction and amount. Furthermore in some embodiments this defocus (or negative-focus) parameter may define a defocus (or negative-focus) shape and may be defined by any (or a combination of two or more) of the following parameters corresponding to direction; width; height; radius; distance; and depth. This parameter set in some embodiments comprises parameters which define any arbitrary defocus shape.

In some embodiments the at least one defocus parameter is provided with at least one focus parameter in order to emphasise audibility of a further selected spatial direction(s) (or shape(s), area(s) or volume(s)).

The spatial audio signal processing can in some embodiments be performed by: obtaining spatial audio signals associated with the media with multiple viewing directions; obtaining the focus/defocus direction and amount parameters (which may optionally comprise obtaining at least one focus/defocus shape information); modifying the spatial audio signals to have the desired (focus and) defocus characteristics; and reproducing the modified spatial audio signals (with headphones or loudspeakers).

The obtained spatial audio signals may, for example, be: Ambisonic signals; loudspeaker signals; parametric spatial audio formats such as a set of audio channels and the associated spatial metadata.

The focus/defocus information can be defined as follows: Focus refers to increasing the relative prominence of audio originating from a selectable direction (or shape or area), whereas de-focus refers to decreasing the relative prominence of audio originating from that direction (or shape or area).

The focus/defocus amount determines how much to focus or to de-focus. It may be, e.g., from 0% to 100%, where 0% means to keep the original sound scene unmodified, and 100% means to focus/de-focus maximally to the desired direction or within the region defined.

The focus/de-focus control in some embodiments may be a switch control to determine whether to focus or de-focus, or it may be controlled otherwise, for example by expanding the focus amount range from −100% to 100% where negative values indicate a de-focusing (or negative-focus) effect and positive values indicate a focusing effect.

It should be noticed that different users may want to have different focus/de-focus characteristics. The original spatial audio signals may be individually modified and reproduced for each user, based on their individual preferences.

Figure 2A:
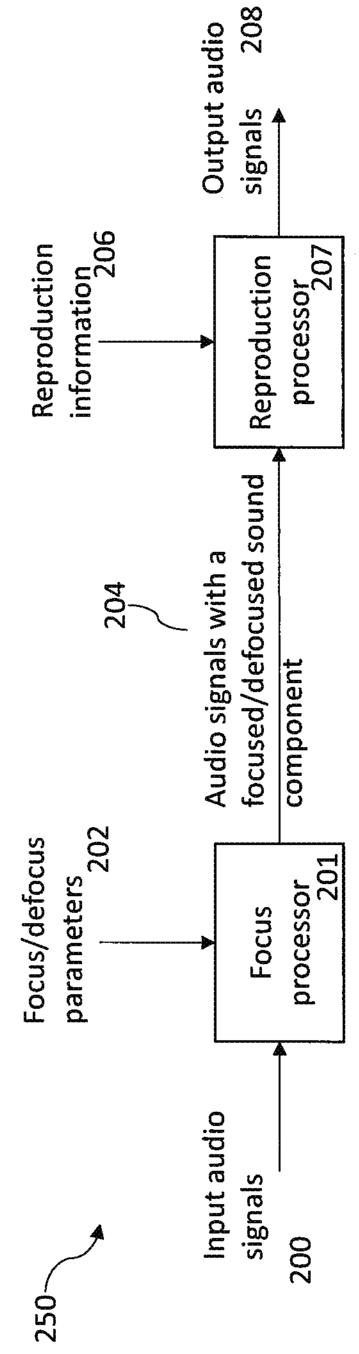
FIGS. 2*a* and 2*b* shows schematically an example playback apparatus and method for operating a playback apparatus according to some embodiments.

FIG. 2*a* illustrates a block diagram of some components and/or entities of a spatial audio processing arrangement 250 according to an example. It would be understood that the two separate steps (focus/defocus processor+reproduction processor) shown in this figure and further detailed later can be implemented as an integrated process, or in some examples in the opposite order as described herein (where the reproduction processor operations are then followed by the focus/defocus processor operations).The spatial audio processing arrangement 250 comprises an audio focus processor 201 configured to receive an input audio signal and furthermore focus/defocus parameters 202 and derive an audio signal with a focused/defocused sound component 204 based on the input audio signal 200 and in dependence of the focus/defocus parameters 202 (which may include a focus/defocus direction; focus/defocus amount; focus/defocus height; focus/defocus radius; focus/defocus distance; and focus/defocus depth with respect to focus/defocus elements). The spatial audio processing arrangement 250 may furthermore comprise an audio reproduction processor 207 configured to receive the audio signals with a focused/defocused sound component 204 and reproduction control information 206 and be configured to derive an output audio signal 208 in a predefined audio format based on the audio signal with a focused/defocused sound component 204 in further dependence of reproduction control information 206 that serves to control at least one aspect pertaining to processing of the spatial audio signal with a focused/defocused component in the audio reproduction processor 207. The reproduction control information 206 may comprise an indication of a reproduction orientation (or a reproduction direction) and/or an indication of an applicable loudspeaker configuration. In consideration of the method for processing a spatial audio signal described above, the audio focus processor 201 may be arranged to implement the aspect of processing the spatial audio signal by modifying the audio scene so as to control emphasis or de-emphasis at least in a portion of the spatial audio signal in the received focus region or direction according to the received focus/defocus amount. The audio reproduction processor 207 may output the processed spatial audio signal based on the observed direction and/or location as a modified audio scene, wherein the modified audio scene demonstrates emphasis at least for said portion of the spatial audio signal in the focus region and according to the received focus amount.

In the illustration of FIG. 2*a*, each of the input audio signal, the audio signal with a focused/defocused sound component and the output audio signal is provided as a respective spatial audio signal in a predefined spatial audio format. Hence, these signals may be referred to as an input spatial audio signal, a spatial audio signal with a focused/defocused sound component and an output spatial audio signal, respectively. Along the lines described in the foregoing, typically a spatial audio signal conveys an audio scene that involves both one or more directional sound sources at respective specific positions of the audio scene as well as the ambience of the audio scene. In some scenarios, though, a spatial audio scene may involve one or more directional sound sources without the ambience or the ambience without any directional sound sources. In this regard, a spatial audio signal comprises information that conveys one or more directional sound components that represent distinct sound sources that have certain position within the audio scene (e.g. a certain direction of arrival and a certain relative intensity with respect to a listening point) and/or an ambient sound component that represents environmental sounds within the audio scene. It should be noted that the division of the audio scene into directional sound component(s) and ambient component is typically a representation or approximation only, whereas an actual sound scene may involve more complex features such as wide sources and coherent acoustic reflections. Nevertheless, even with such complex acoustic features, the conceptualization of an audio scene as a combination of direct and ambient components is typically a fair representation or approximation at least in a perceptual sense.

Typically, the input audio signal and the audio signal with a focused/defocused sound component are provided in the same predefined spatial format, whereas the output audio signal may be provided in the same spatial format as applied for the input audio signal (and the audio signal with a focused/defocused sound component) or a different predefined spatial format may be employed for the output audio signal. The spatial audio format of the output audio signal is selected in view of the characteristics of the sound reproduction hardware applied for playback for the output audio signal. In general, the input audio signal may be provided in a first predetermined spatial audio format and the output audio signal may be provided in a second predetermined spatial audio format. Non-limiting examples of spatial audio formats suitable for use as the first and/or second spatial audio format include Ambisonics, surround loudspeaker signals according to a predefined loudspeaker configuration, a predefined parametric spatial audio format. More detailed non-limiting examples of usage of these spatial audio formats in the framework of the spatial audio processing arrangement 250 as the first and/or second spatial audio format are provided later in this disclosure.

The spatial audio processing arrangement 250 is typically applied to process the input spatial audio signal 200 as a sequence of input frames into a respective sequence of output frames, each input (output) frame including a respective segment of digital audio signal for each channel of the input (output) spatial audio signal, provided as a respective time series of input (output) samples at a predefined sampling frequency. In some embodiments the input signal to the spatial audio processing arrangement 250 can be an encoded form, for example AAC, or AAC+ embedded metadata. In such embodiments the encoded audio input can be initially decoder. Similarly in some embodiments, the output from the spatial audio processing arrangement 250 could be encoded in any suitable manner.

In typical example, the spatial audio processing arrangement 250 employs a fixed predefined frame length such that each frame comprises respective L samples for each channel of the input spatial audio signal, which at the predefined sampling frequency maps to a corresponding duration in time. As an example in this regard, the fixed frame length may be 20 milliseconds (ms), which at a sampling frequency of 8, 16, 32 or 48 kHz results in a frame of L=160, L=320, L=640 and L=960 samples per channel, respectively. The frames may be non-overlapping or they may be partially overlapping, depending on if the processors apply filter banks and how these filter banks are configured. These values, however, serve as non-limiting examples and frame lengths and/or sampling frequencies different from these examples may be employed instead, depending e.g. on the desired audio bandwidth, on desired framing delay and/or on available processing capacity.

In the spatial audio processing arrangement 250, the focus/defocus refers to a user-selectable direction/amount parameter (or a spatial region of interest). The focus/defocus may be, for example, a certain direction, distance, radius, arc of the audio scene in general. In another example, the focus/defocus region in which a (directional) sound source of interest is currently positioned. In the former scenario, the user-selectable focus/defocus may denote a region that stays constant or changes infrequently since the focus is predominantly in a specific direction (or a spatial region), whereas in the latter scenario the user-selected focus/defocus may change more frequently since the focus/defocus is set to a certain sound source that may (or may not) change its position (or shape/size) in the audio scene over time. In an example, the focus/defocus may be defined, for example, as an azimuth angle that defines the direction.

Figure 2B:
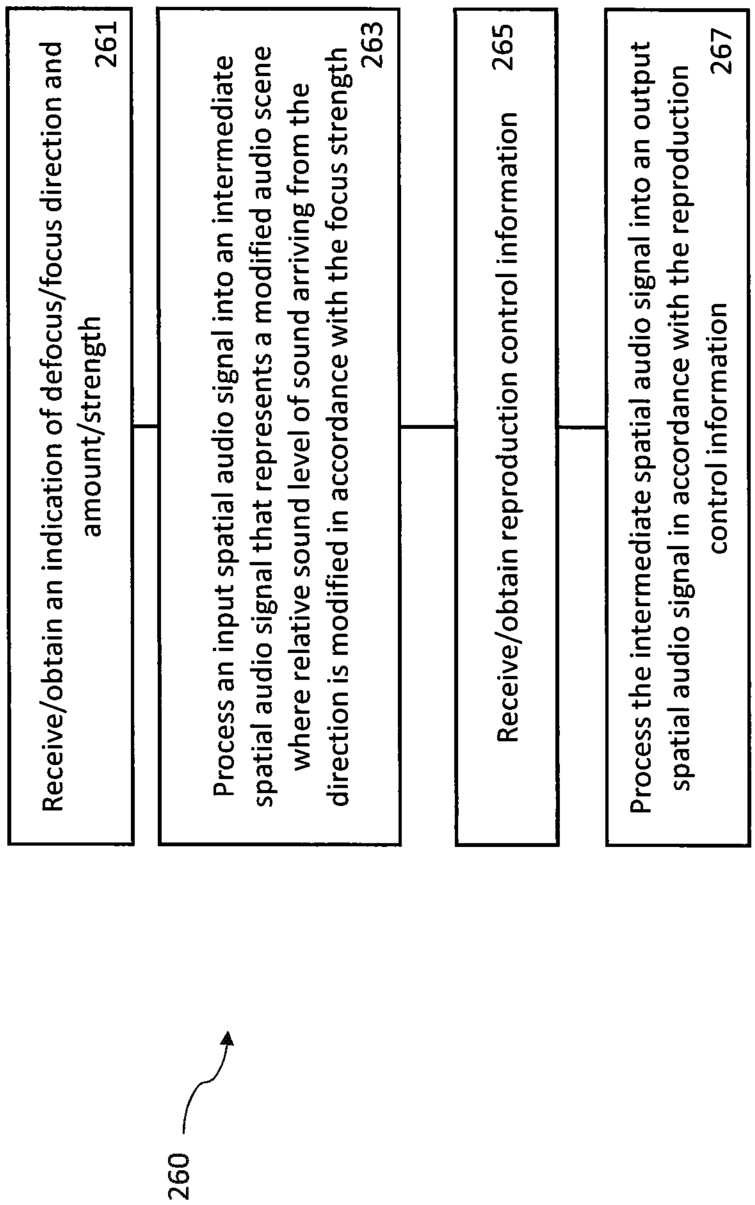

The functionality described in the foregoing with references to components of the spatial audio processing arrangement 250 may be provided, for example, in accordance with a method 260 illustrated by a flowchart depicted in FIG. 2*b*. The method 260 may be provided e.g. by an apparatus arranged to implement the spatial audio processing system 250 described in the present disclosure via a number of examples. The method 260 serves as a method for processing an input spatial audio signal that represents an audio scene into an output spatial audio signal that represents a modified audio scene. The method 260 comprises receiving an indication of a focus/defocus direction and an indication of a focus/defocus strength or amount, as indicated in block 261. The method 260 further comprises processing the input spatial audio signal into an intermediate spatial audio signal that represents the modified audio scene where relative level of sound arriving from said focus/defocus direction is modified according to said focus/defocus strength, as indicated in block 263. The method 260 further comprises receiving reproduction control information that controls processing of the intermediate spatial signal into the output spatial audio signal, as indicated in block 265. The reproduction control information may define, for example, at least one of a reproduction orientation (e.g. a listening direction or a viewing direction) or a loudspeaker configuration for the output spatial audio signal. The method 260 further comprises processing the intermediate spatial audio signal into the output spatial audio signal in accordance with said reproduction control information, as indicated in block 267.

The method 260 may be varied in a plurality of ways, for example in accordance with examples pertaining to respective functionality of components of the spatial audio processing arrangement 250 provided in the foregoing and in the following.

In the following examples a defocusing operation is described in further detail however it would be understood that the same operations could be applied to further focusing operations as well as further defocusing operations.

In some embodiments the input to the spatial audio processing arrangement 250 are Ambisonic signals. The apparatus can be configured to receive (and the method can be applied to) Ambisonic signals of any order. The Ambisonic audio signals could be first-order Ambisonic (FOA) signals consisting of an omnidirectional signal and three orthogonal first-order patterns along y,z,x coordinate axes. The y,z,x coordinate order is selected here because it is the same order as the $1^{st}$ order coefficients of the typical ACN (Ambisonics channel numbering) channel ordering of Ambisonic signals.

Note that Ambisonics audio format can express the spatial audio signal in terms of spatial beam patterns, and it would be straightforward for the person skilled in the art to take the example hereafter and design alternative sets of spatial beam patterns to express the spatial audio. Ambisonics audio format furthermore is a particularly relevant audio format since it is the typical way to express spatial audio in context of 360 video. Typical sources of Ambisonic audio signals include microphone arrays and content in VR video streaming services (such as YouTube 360).

Figure 3A:
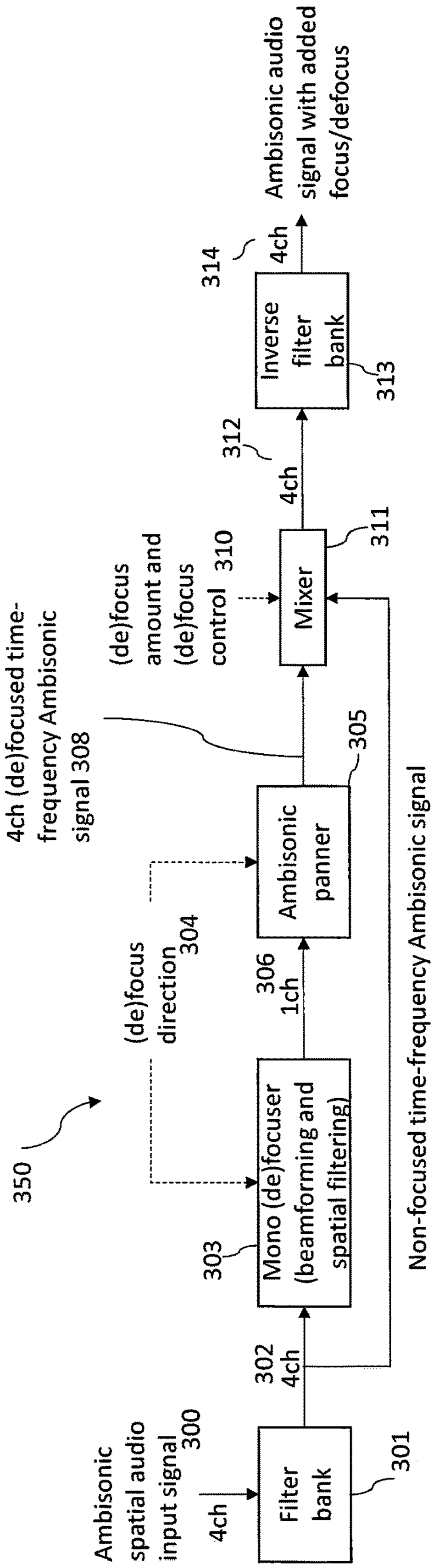
FIGS. 3*a* and 3*b* show schematically an example focus processor as shown in FIG. 2*a* with a higher order ambisonic audio signal input and method of operating the example focus processor according to some embodiments.

With respect to FIG. 3*a* is shown a focus processor 350 in context of an Ambisonic input and output. The figure assumes first order Ambisonics (FOA) signals (4 channels), however, higher-order Ambisonics (HOA) may be applied in place of FOA. In embodiments implementing a HOA input format the number of channels in place of 4 channels could be, e.g., 9 channels ($2^{nd}$ order Ambisonics) or 16 channels ($3^{rd}$ order Ambisonics).

The example Ambisonic signals $X_{FOA}(t)$ 300 and the (de)focus direction 304, (de)focus amount and (de)focus control 310 are the inputs to the focus processor 350.

In some embodiments the focus processor 350 comprises a filter bank 301. The filter bank 301 is configured in some embodiments to convert the Ambisonic (FOA) signals 300 (corresponding to Ambisonic or spherical harmonic patterns) to generate time-frequency domain versions of the time domain input audio signals. The filter bank 301 in some embodiments may be a short-time Fourier transform (STFT) or any other suitable filter bank for spatial sound processing, such as the complex-modulated quadrature mirror filter (QMF) bank. The output of the filter bank 301 is a time-frequency domain Ambisonic audio signal 302 in frequency bands. A frequency band could be one or more frequency bins (individual frequency components) of the applied filter bank 301. The frequency bands could approximate a perceptually relevant resolution such as the Bark frequency bands, which are spectrally more selective at low frequencies than at the high frequencies. Alternatively, in some implementations, frequency bands can correspond to the frequency bins.

The (non-focused) time-frequency domain Ambisonic audio signal 302 is output to a mono focuser 303 and mixer 311.

The focus processor 301 may further comprise a mono focuser 303. The mono focuser 303 is configured to receive the transformed (non-focused) time-frequency domain Ambisonic signals 302 from the filter bank 301 and furthermore receive the (de)focus direction parameters 304.

The mono (de)focuser 303 may implement any known method to generate a mono focused audio output based on the FOA input. In this example the mono focuser 303 implements a minimum-variance distortionless response (MVDR) mono focused audio output. The MVDR beamforming operation attempts to obtain the target signal from the desired focus direction without distortion, while with this constraint finding adaptively beamforming weights that attempt to minimize the output energy (in other words suppressing the interfering energy). In some embodiments the mono focuser 303 is configured to combine the frequency band signals (for example the four channels in this case of FOA) to one beamformed signal by:

$$y(b,n)=w^H(k,n)\times(b,n),$$

where k is the frequency band index, b is the frequency bin index (where b is included in the band k), n is the time index, y(b,n) is the one-channel beamform signal of bin b, w(k,n) is a 4×1 beamform weight vector, and x(b,n) is a 4×1 FOA signal vector having the four frequency bin b signal channels. In this expression, the same beamform weights w(k, n) are applied to signals x(b, n) for the bins b that are included in band k.

The mono focuser 303 implementing a MVDR beamformer may use for each frequency band k:

- the estimate of the covariance matrix of the signals x(b, n) within the bins at band k (and potentially with temporal averaging over several time indices n) and
- a steering vector according to the focus direction. In the example of FOA signals the steering vector may be generated based on the unit vector pointing towards the focus direction. For example, the steering vector for FOA may be $$\begin{bmatrix} 1 \\ v(n) \end{bmatrix},$$

where v(n) is the unit vector (in the coordinate ordering y,z,x) pointing towards the focus direction.

Based on the covariance matrix estimate and the steering vector a known MVDR formula can be used to generate the weights w(k,n).

The mono focuser 303 can thus in some embodiments provide a single channel focus output signal 306, which is provided to an Ambisonics panner 305.

In some embodiments the Ambisonics panner 305 is configured to receive the channel (de)focus output signal 306 and the (de)focus direction 304 and generate an Ambisonic signal where the mono focus signal is positioned at the focus direction. The focused time-frequency Ambisonic signal 308 output generated by the Ambisonics panner 305 may be generated based on $$y_{FOA}(b, n) = y(b, n)\begin{bmatrix} 1 \\ v(n) \end{bmatrix}.$$

The (de)focused time-frequency Ambisonic signal $y_{FOA}$(b,n) 308 in some embodiments can then be output to a mixer 311.

In some embodiments the output of the beamformer, such as the MVDR, can be cascaded with a post filter. A post filter is typically a process that adaptively modifies the gains or energies of the beamformer output in frequency bands. For example, it is known that while MVDR is effective in suppressing individual strong interfering sound sources, it performs only modestly in ambient acoustic scenes, such as outdoor recordings with traffic noise. This is because MVDR effectively aims to steer the beam pattern minima to those directions where interferers reside. When the interfering sound is spatially spread as in traffic noise, the MVDR does not suppress the interferers that effectively.

The post-filter can therefore in some embodiments be implemented to estimate the sound energy in frequency bands at the focus direction. Then the beamformer output energy is measured at the same frequency bands, and gains are applied in frequency bands to correct the sound spectrum to improve the estimated target spectrum. In such embodiments the post-filter can further suppress interfering sounds.

An example of a post filter was described in Delikaris-Manias, Symeon, and Ville Pulkki. "Cross pattern coherence algorithm for spatial filtering applications utilizing microphone arrays." IEEE Transactions on Audio, Speech, and Language Processing 21, no. 11 (2013): 2356-2367, where the target energy at the look direction is estimated using the cross-spectral energy estimate between first and second order spherical harmonic signals. The cross-spectral estimate may be obtained also for other patterns, such as between zeroth (omnidirectional) and first (dipole) order spherical harmonic signals. The cross-spectral estimate provides the energy estimate for the target direction.

When the post-filtering is implemented the beamforming equation can be appended with a gain g(k,n)

$$y'(b, n)=g(k,n)w^H(k,n)\times(b,n)$$

The gain g(k,n) can be derived as follows using the cross-spectral energy estimation method. First the cross-correlation between the omnidirectional FOA signal component and a figure-of-eight signal having the positive lobe towards the focus direction is formulated, $$C_b(b, n) = E\left[x_W(b, n)\left(v^T(n)\begin{bmatrix} x_Y(b, n) \\ x_Z(b, n) \\ x_X(b, n) \end{bmatrix}\right)^*\right],$$

where signals x with subindices (W,Y,Z,X) denote the signal components of the four FOA signals x(b,n), the asterisk (*) denotes the complex conjugate, and E denotes the expectation operator, which can be implemented as an average operator over a desired temporal area. The real-valued, nonnegative cross correlation measure for the band k is then formulated by $$C(k, n) = \max\left[0, \operatorname{Re}\left(\sum_{b \in k} C_b(b, n)\right)\right],$$

In practical terms, the value C(k,n) is an energy estimate of the sound arriving from the focus direction at band k. Then, the energy D(k,n) of the bins within band k of the beamform output y(b,n)=w'(k,n)x(b,n) is estimated.

$$D(k, n) = E\left[\sum_{b \in k} y(b, n) y^*(b, n)\right],$$

The spatial filter gain can be then obtained as $$g(k, n) = \min\left[1, \frac{C(k, n)}{D(k, n)}\right].$$

In other words, when the energy estimate C(k,n) is smaller than the beamform output energy D(k,n), then the beamform output energy at band k is reduced by the spatial filter. The function of the spatial filter is thus to further adjust the spectrum of the beamformer output closer to that of the sounds arriving from the focus direction.

In some embodiments the (de)focus processor can utilize this post-filtering. The mono focuser 303 beamformed output y(b,n) can be processed with post filter gains in frequency bands to generate the post-filtered beamformed output y'(b,n), where y'(b,n) is applied in place of y(b,n). It is understood that there are various suitable beamformers and post filters which may be applied other than that described as the example above.

In some embodiments the focus processor 350 comprises a mixer 311. The mixer is configured to receive the (de) focused time-frequency Ambisonics signal $y_{FOA}$(b,n) 308 and the non-focused time-frequency Ambisonics signal x(b, n) 302 (with potential delay adjustments where the MVDR estimation and processing involve look-ahead processing). The mixer 311 furthermore receives the (de)focus amount and focus/de-focus control parameters 310.

In this example the (de)focus control parameter is a binary switch of "focus" or "de-focus". The (de)focus amount parameter a(n) expressed as a factor between 0 . . . 1, where 1 is the maximum focus, utilized to describe either the focus or de-focus amount, depending on which mode is used.

In some embodiments when the de-focus-parameter is in "focus" mode the output of the mixer 311 is:

$$y_{MIX}(b,n)=a(n)y_{FOA}(b,n)+(1-a(n))x(b,n),$$

In some embodiments the value $y_{FOA}(k,n)$ in the above formula is modified by a factor (e.g., by a constant of 4) before the mixing to further emphasize the (de)focus effect.

In some embodiments the mixer, when the de-focus-parameter is in "de-focus" mode, can be configured to perform:

$$y_{MIX}(b,n)=x(b,n)-a(n)y_{FOA}(b,n).$$

In other words, when a(n) is 0, then the de-focus processing is also at zero, however, when a(n) is larger or up to 1, then the mixing procedure subtracts from the spatial FOA signal x(b,n) the signal $y_{FOA}$(b,n), which is the spatialized focus signal. Due to the subtraction, the amplitude of the signal component from the focus direction is decreased. In other words, de-focus processing takes place, and the resulting Ambisonics spatial audio signal has a reduced amplitude for the sound from the focus direction. In some configurations the $y_{MIX}$(b,n) 312 could be amplified based on a rule as a function of a(n) to account for the average loss of loudness due to the de-focus processing.

The output of the mixer 311, the mixed time-frequency Ambisonics audio signal 312 is passed to an inverse filter bank 313

In some embodiments the focus processor 350 comprises an inverse filter bank 313 configured to receive the mixed time-frequency Ambisonics audio signal 312 and transform the audio signal to the time domain. The inverse filter bank 313 generates a suitable pulse code modulated (PCM) Ambisonics audio signal with the added focus/de-focus.

Figure 3B:
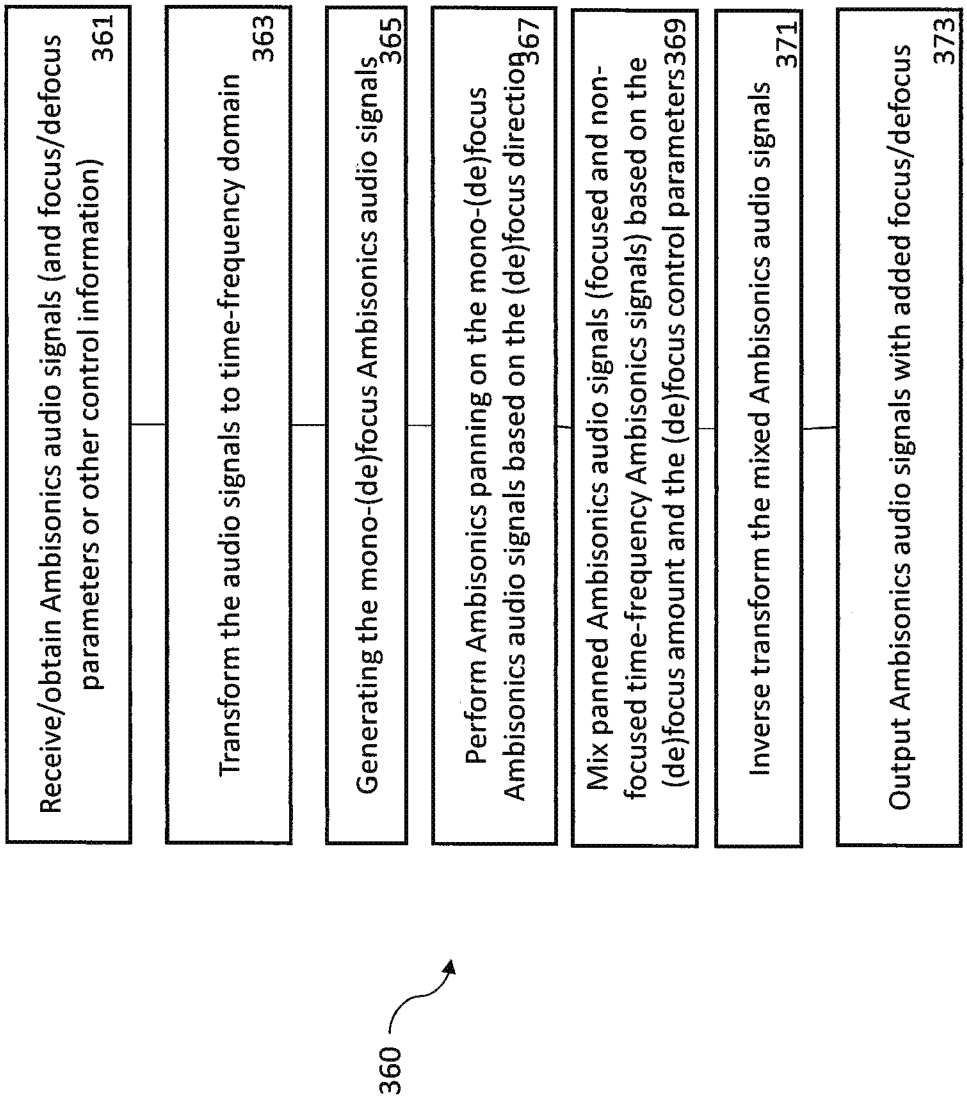

With respect to FIG. 3*b* is shown a flow diagram of the operation 360 of the FOA focus processor as shown in FIG. 3*a*.

The initial operation is receiving the Ambisonics (FOA) audio signals (and the focus/de-focus parameters such as direction, width, amount or other control information) as shown in FIG. 3*b* by step 361.

The next operation is the generating of the transformed Ambisonics audio signals into time-frequency domain as shown in FIG. 3*b* by step 363.

Having generated the time-frequency domain Ambisonics audio signals the next operation is one of generating the mono focus Ambisonics audio signals from the time-frequency domain Ambisonics audio signals based on the focus direction (for example using beamforming) as shown in FIG. 3*b* by step 365.

Then Ambisonics panning is performed on the mono-(de) focus Ambisonics audio signals based on the focus direction as shown in FIG. 3*b* by step 367.

The panned Ambisonic audio signals (the (de)focused time-frequency Ambisonic signal) is then mixed with the non-focused time-frequency Ambisonic signals based on the (de)focus amount and the (de)focus control parameters as shown in FIG. 3*b* by step 369.

The mixed Ambisonic audio signals may then be inverse transformed as shown in FIG. 3*b* by step 371.

Then the time domain Ambisonic audio signals are then output as shown in FIG. 3*b* by step 373.

Figure 4A:
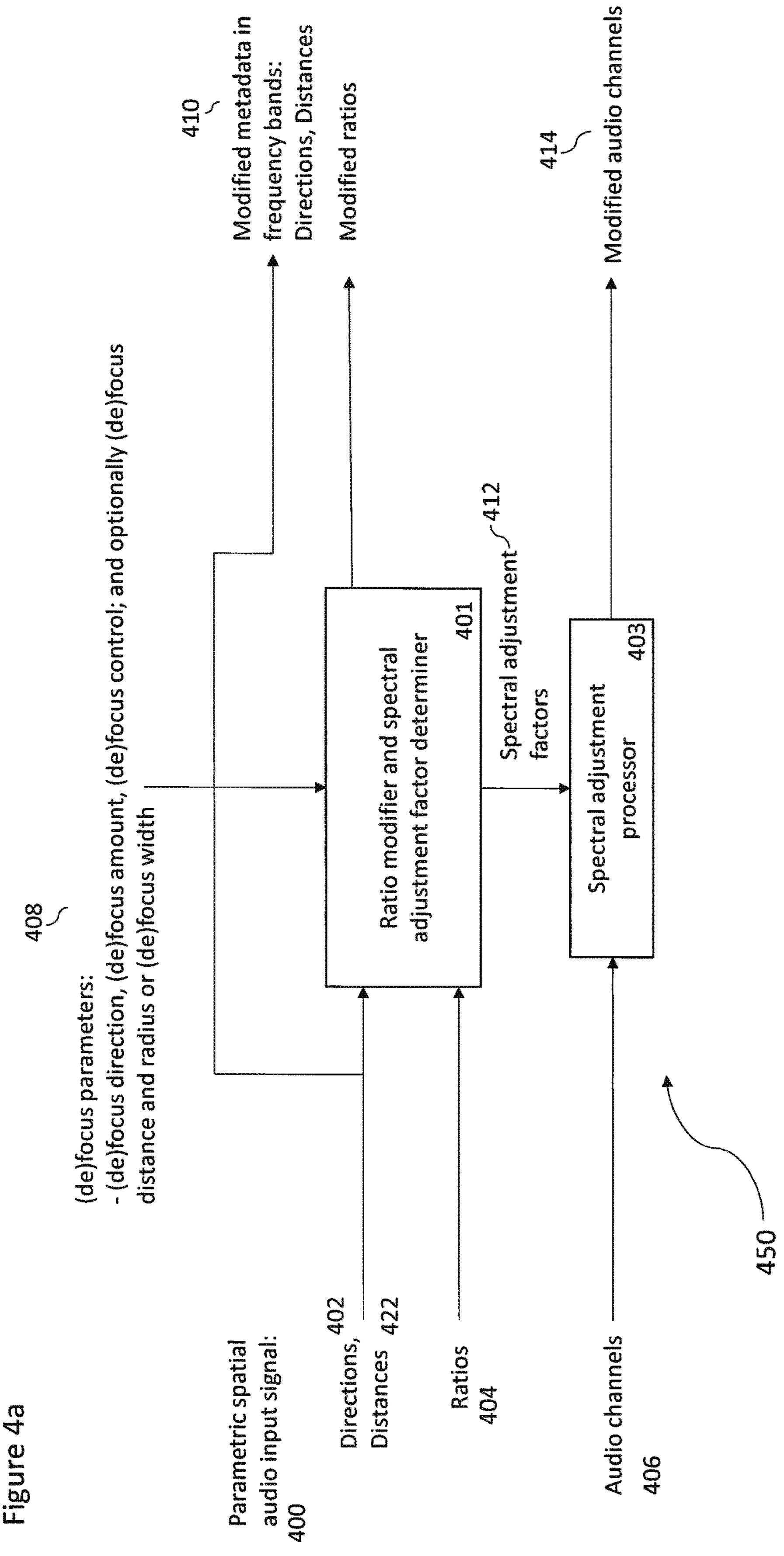
FIGS. 4*a* and 4*b* show schematically an example focus processor as shown in FIG. 2*a* with a parametric spatial audio signal input and method of operating the example focus processor according to some embodiments.

With respect to FIG. 4*a* is shown a focus processor which is configured to receive a parametric spatial audio signal as an input. The parametric spatial audio signals comprise audio signals and spatial metadata such as direction(s) and direct-to-total energy ratio(s) in frequency bands. The structure and generation of parametric spatial audio signals are known and their generation have been described from microphone arrays (e.g., mobile phones, VR cameras). A parametric spatial audio signal can furthermore be generated from loudspeaker signals and Ambisonic signals as well. The parametric spatial audio signal in some embodiments may be generated from an IVAS (Immersive Voice and Audio Services) audio stream, which can be decoded and demultiplexed to the form of spatial metadata and audio channels. A typical number of audio channels in such a parametric spatial audio stream is two audio channels audio signals, however in some embodiments the number of audio channels can be any number of audio channels.

In some examples the parametric information comprises depth/distance information, which may be implemented in 6-degrees of freedom (6DOF) reproduction. In 6DOF, the distance metadata is used (along with the other metadata) to determine how the sound energy and direction should change as a function of user movement.

In this example each spatial metadata direction parameter is associated both with a direct-to-total energy ratio and a distance parameter. The estimation of distance parameters in context of parametric spatial audio capture has been detailed in earlier applications such as GB patent applications GB1710093.4 and GB1710085.0 and is not explored further for clarity reasons.

The focus processor 450 configured to receive parametric spatial audio 400 is configured to use the (de)focus parameters to determine how much the direct and ambient components of the parametric spatial audio signal should be attenuated or emphasized to enable the (de)focus effect. The focus processor 450 is described below in two configurations. The first uses (de)focus parameters: direction and amount, further including a width which results in focus/de-focus arcs. In this configuration the 6DOF distance parameter is optional. The second uses parameters (de)focus direction and amount and distance and radius, which results in focus/de-focus spheres at a certain position. In this configuration a 6DOF distance parameter is needed. The differences of these configurations are expressed only where necessary in the below descriptions.

In the following example the method (and the formulas) are expressed without any variations over time it should be understood that all the parameters may vary over the time.

In some embodiments the focus processor comprises a ratio modifier and spectral adjustment factor determiner 401 which is configured to receive the focus parameters 408 and additionally the spatial metadata consisting of directions 402 (and in some embodiments distances 422), and direct-to-total energy ratios 404 in frequency bands.

The ratio modifier and spectral adjustment factor determiner 401 is configured to receive the focus parameters and additionally the spatial metadata consisting of directions 402, direct-to-total energy ratios 404 (and in some embodiments distances 422) in frequency bands.

The following description until otherwise stated considers a situation where the focus parameters include direction, width and amount. In some embodiments the ratio modifier and spectral adjustment factor determiner 401 is configured to determine an angular difference β(k), between the focus direction (one for all frequency bands k) and the spatial metadata directions (potentially different at different frequency bands k). In some embodiments $v_m(k)$ is determined as a column unit vector pointing towards the direction parameter of the spatial metadata at band k, and $v_f$ as a column unit vector pointing towards the focus direction. The angular distance β(k) can be determined as $$\beta(k)=a\cos(v_m^T(k)v_f),$$

where $v_m^T(k)$ is the transpose of $v_m(k)$.

The ratio modifier and spectral adjustment factor determiner 401 is then configured to determine a direct-gain parameter f (k). The focus amount parameter a may be expressed as a normalized value between 0 . . . 1 (where 0 means zero focus/de-focus and 1 means maximum focus/de-focus), and a focus-width $\beta_0$, which for example could be at a certain time instance 20 degrees.

When the ratio modifier and spectral adjustment factor determiner 401 is configured to perform focus (as opposed of de-focus), an example gain formula is $$f(k)=\begin{cases} c*a+(1-a), & \text{when } \beta(k)\le\beta_0 \\ 1-a, & \text{otherwise} \end{cases},$$

where c is a gain constant for the focus, for example 4. When the ratio modifier and spectral adjustment factor determiner 401 is configured to perform de-focus an example formula is $$f(k)=\begin{cases} 1-a, & \text{when } \beta(k)\le\beta_0 \\ c*a+(1-a), & \text{otherwise} \end{cases}.$$

In some embodiments, the constant c may have a different value in the case of de-focus than in the case of focus. Moreover, in practice, it may be desirable to smooth the above functions such that the focus gain function smoothly transitions from a high value at the focus area to a low value at the non-focused area.

The following description until otherwise stated considers a situation where the focus parameters include direction, distance, radius and amount. In some embodiments the ratio modifier and spectral adjustment factor determiner 401 is configured to determine a focus position $p_f$ and a metadata position $p_m(k)$, formulated as follows. In some embodiments $v_m(k)$ is determined as a column unit vector pointing towards the direction parameter of the spatial metadata at band k, and $v_f$ as a column unit vector pointing towards the focus direction. The focus position is formulated as $p_f=v_f d_f$, where $d_f$ is the focus distance. The spatial metadata position is formulated as $p_m(k)=v_m(k)d_m(k)$, where $d_m(k)$ is the distance parameter at spatial metadata at band k. In some embodiments the ratio modifier and spectral adjustment factor determiner 401 is configured to determine a positional difference γ(k), between a focus position $p_f$ (one for all frequency bands k) and the spatial metadata position $p_m(k)$, potentially different at different frequency bands k). The positional difference γ(k) can be determined as $$\gamma(k)=|p_f-p_m(k),|$$

where |.| operator is for determining the distance of a vector.

The ratio modifier and spectral adjustment factor determiner 401 is then configured to determine a direct-gain parameter f(k). The focus amount parameter a may be expressed as a normalized value between 0 . . . 1 (where 0 means zero focus/de-focus and 1 means maximum focus/de-focus), and the focus-radius is denoted $\gamma_0$, which for example could be at a certain time instance 1 meter.

When the ratio modifier and spectral adjustment factor determiner 401 is configured to perform focus (as opposed of de-focus), an example gain formula is $$f(k)=\begin{cases} c*a+(1-a), & \text{when } \gamma(k)\le\gamma_0 \\ 1-a, & \text{otherwise} \end{cases},$$

where c is a gain constant for the focus, for example 4. When the ratio modifier and spectral adjustment factor determiner 401 is configured to perform de-focus an example formula is $$f(k)=\begin{cases} 1-a, & \text{when } \gamma(k)\le\gamma_0 \\ c*a+(1-a), & \text{otherwise} \end{cases}.$$

In some embodiments, the constant c may have a different value in the case of de-focus than in the case of focus. Moreover, in practice, it may be desirable to smooth the above functions such that the focus gain function smoothly transitions from a high value at the focus area to a low value at the non-focused area.

The remaining description is applicable to the both focus parameter configurations described above. In some embodiments the ratio modifier and spectral adjustment factor determiner 401 is further configured to determine a new direct portion value D(k) of the parametric spatial audio signal as:

$$D(k)=r(k)*f(k),$$

where r(k) is the direct-to-total energy ratio value at band k.

In some embodiments the ratio modifier and spectral adjustment factor determiner 401 is configured to determine a new ambient portion value A(k) (in focus processing) as:

$$A(k)=(1-r(k))*(1-a).$$

In some embodiment the ratio modifier and spectral adjustment factor determiner 401 is configured to determine a new ambience component in de-focus processing using A(k)=(1−r(k)), which means that de-focus processing does not impact the spatially surrounding ambient energy.

The ratio modifier and spectral adjustment factor determiner 401 is then configured to determine a spectral correction factor s(k) that is output to the spectral adjustment processor 403 is then formulated based on the overall modification of the sound energy. For example $$s(k)=\sqrt{D(k)+A(k)}.$$

In some embodiments the ratio modifier and spectral adjustment factor determiner 401 is configured to determine a new modified direct-to-total energy ratio parameter r'(k) to replace r(k) based on:

$$r'(k)=\frac{D(k)}{D(k)+A(k)}.$$

At the numerically undetermined case D(k)=A(k)=0, then r'(k) can also be set to zero.

The direction values 402 (and distance values 422) in the spatial metadata may in some embodiments be passed unmodified and output.

The focus processor in some embodiments comprises a spectral adjustment processor 403. The spectral adjustment processor 403 is configured to receive the audio signals (which in some embodiments are in a time-frequency representation, or alternatively they are first transformed to the time-frequency domain) 406 and the spectral adjustment factors 412. In some embodiments the output audio signals 414 also can be in a time-frequency domain, or inverse transformed to the time domain before being output. The domain of the input and output may depend on the implementation.

The spectral adjustment processor 403 is configured to multiply, for each band k, the frequency bins (of the time-frequency transform) of all channels within the band k by the spectral adjustment factor s(k). In other words the spectral adjustment processor 403 is configured to perform the spectral adjustment. The multiplication/spectral correction may be smoothed over time to avoid processing artefacts.

In other words, the focus processor 450 is configured to modify the spectrum of the audio signals and the spatial metadata such that the procedure results in a parametric spatial audio signal that has been modified according to the (de)focus parameters.

Figure 4B:
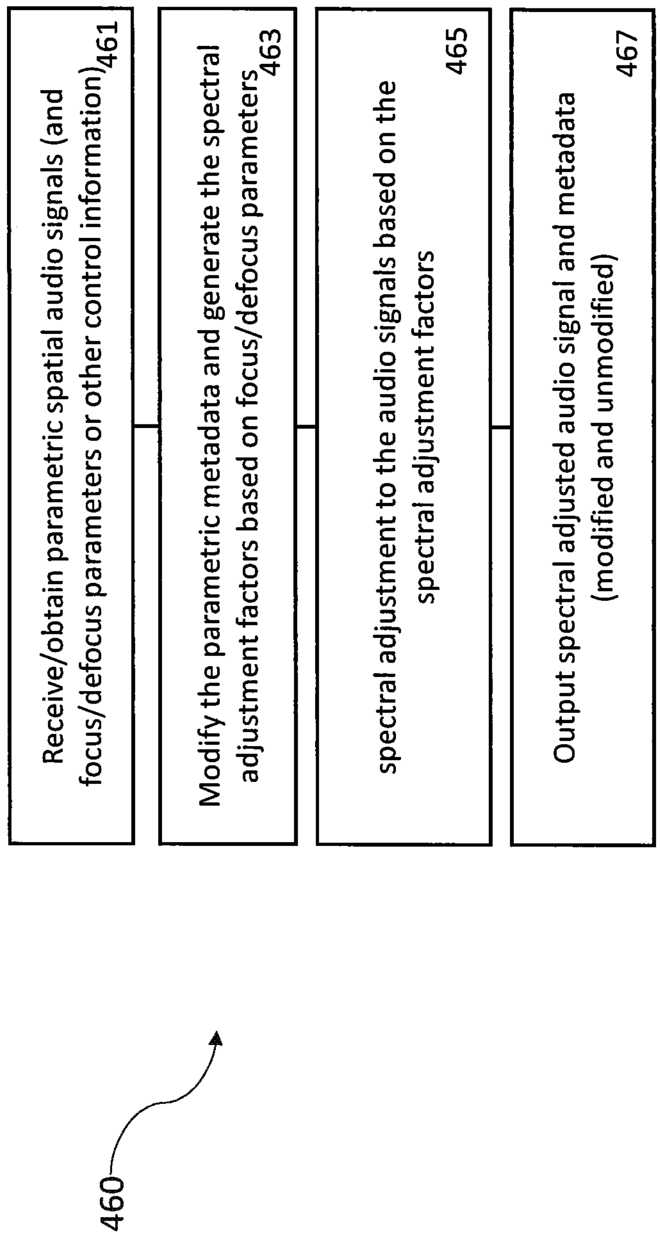

With respect to FIG. 4*b* is shown a flow diagram 460 of the operation of the parametric spatial audio input processor as shown in FIG. 4*a*.

The initial operation is receiving the parametric spatial audio signals (and focus/defocus parameters or other control information) as shown in FIG. 4*b* by step 461.

The next operation is the modifying of the parametric metadata and generating the spectral adjustment factors as shown in FIG. 4*b* by step 463.

The next operation is making a spectral adjustment to the audio signals as shown in FIG. 4*b* by step 465.

Then the spectral adjusted audio signal and modified (and unmodified) metadata can then be output as shown in FIG. 4*b* by step 467.

Figure 5A:
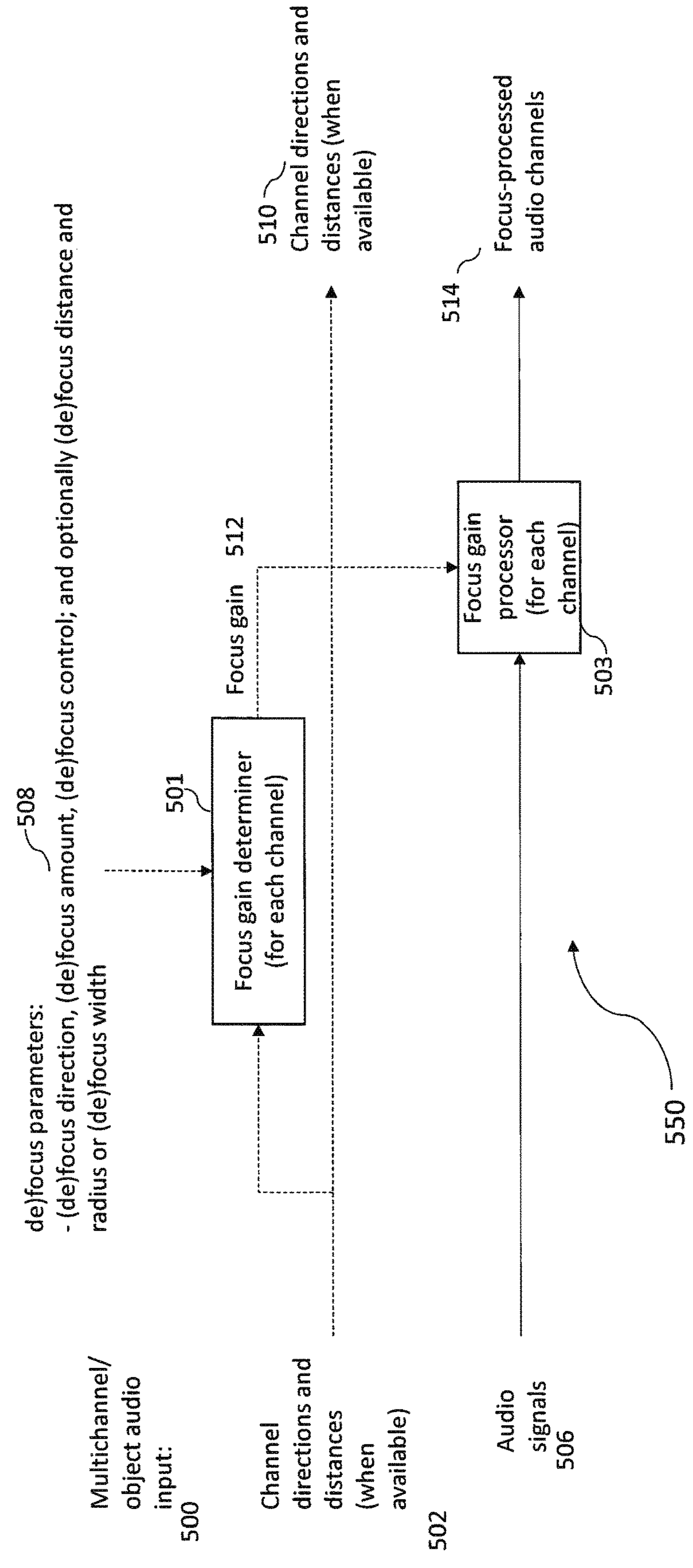
FIGS. 5*a* and 5*b* show schematically an example focus processor as shown in FIG. 2*a* with a multichannel and/or audio object audio signal input and method of operating the example focus processor according to some embodiments.

With respect to FIG. 5*a* is shown a focus processor 550 which is configured to receive a multichannel or object audio signal as an input 500. The focus processor in such examples may comprise a focus gain determiner 501. The focus gain determiner 501 is configured to receive the focus/defocus parameters 508 and the channel/object positional/directional information, which may be static or time-variant. The focus gain determiner 501 is configured to generate a direct gain f(k) parameter 512 based on the (de)focus parameters 508 (such as (de)focus direction, (de) focus amount, (de)focus control and optionally (de)focus distance and radius or (de)focus width) and the spatial metadata information 502 from the input signal 500. In some embodiments the channel signal directions are signalled, and in some embodiments they are assumed. For example, when there are 6 channels, the directions may be assumed to be 5.1 audio channel directions.

In some embodiments there may be a lookup table which is used to determine channel directions as a function of the number of channels.

In some embodiments there is no filter bank, in other words, there is only one frequency band k. The direct-gains f(k) for each audio channel are output as focus gains to a focus gain processor 503.

In some embodiments the focus gain processor 503 is configured to receive the audio signals and the focus gain values 512 and process the audio signals 506 based on the focus gain values 512 (per channel), with potentially some temporal smoothing. The processing based on the focus gain values 512 may in some embodiments be a multiplication of the channel/object signals with the focus gain values.

The output of the focus gain processor 503 are focus-processed audio channels. The channel directional/positional information is unaltered and also provided as the output 510.

In some embodiments the de-focus processing may be configured more broadly than for one direction. For example, it may be that the focus width $\beta_0$ can be included as an input parameter. In these embodiments a user can also generate de-focus arcs. In another example, it may be that the focus distance $d_f$ and focus radius $\gamma_0$ can be included as input parameters. In these embodiments a user can generate de-focus spheres at a determined position. Similar procedures can be also adopted for the other input spatial audio signal types.

In some embodiments the audio objects (spatial metadata) may comprise a distance parameter, which can be also taken into account. For example the focus/defocus parameters can determine a focus position (direction and distance), and a radius parameter to control a focus/de-focus area around that position. In such embodiments, the user can generate de-focus patterns such as shown in FIG. 1*c* and described previously. Similarly, further spatially related parameters could be defined to allow the user to control different shapes for the de-focus area. In some embodiments the attenuation of audio objects within the de-focus area could be an attenuation by a fixed decibel number (e.g. 10 dB) multiplied with the desired de-focusing amount between 0 and 1, and leaving the audio objects outside the de-focus direction without gain modification (or not applying gains or attenuations related to the focus operation to audio objects outside of the de-focus direction). In formulation of the direct gain f(k) (to be output as focus gain) the focus gain determiner 501 can utilize the same formulas as described in context of ratio modifier and spectral adjustment factor determiner 401 in FIG. 4*a* to determine a direct gain f(k). The exception is that in case of audio objects/channels there typically is only one frequency band, and that the spatial metadata typically indicates only object directions/distances, and not ratios. When the distance is not available, then a fixed distance, for example 2 meters can be assumed.

Figure 5B:
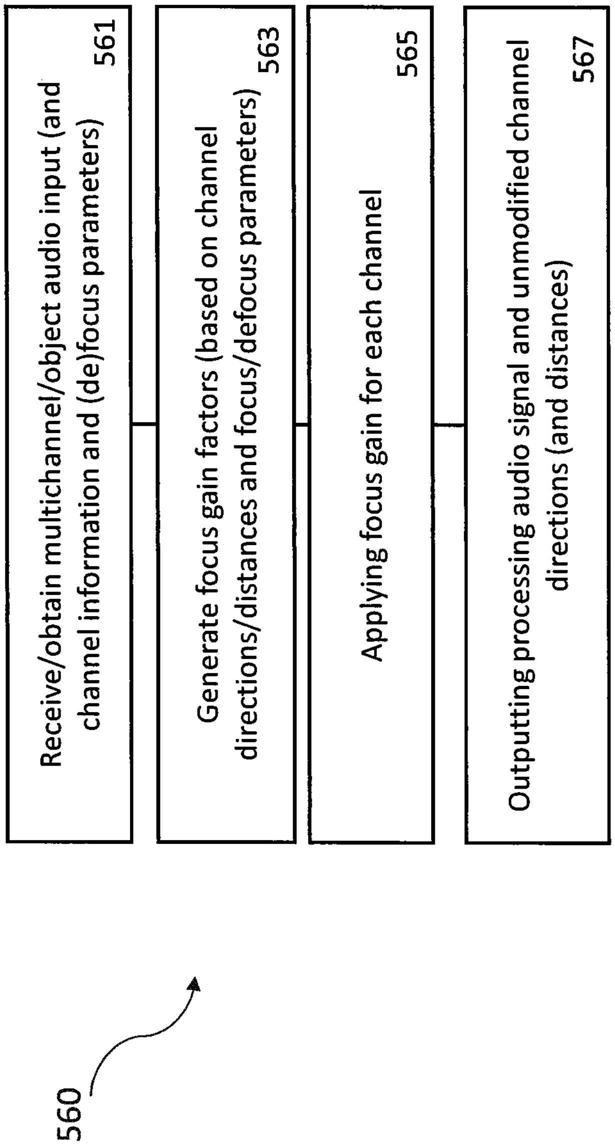

With respect to FIG. 5*b* is shown a flow diagram 560 of the operation of the multichannel/object audio input processor as shown in FIG. 5*a*.

The initial operation is receiving the multichannel/object audio signals and in some embodiments channel information such as the number of channels and/or the distribution of the channels (and focus/defocus parameters or other control information) as shown in FIG. 5*b* by step 561.

The next operation generating the focus gain factors as shown in FIG. 5*b* by step 563.

The next operation is applying a focus gain for each channel audio signals as shown in FIG. 5*b* by step 565.

Then the processing audio signal and unmodified channel directions (and distances) can then be output as shown in FIG. 5*b* by step 567.

Figure 6A:
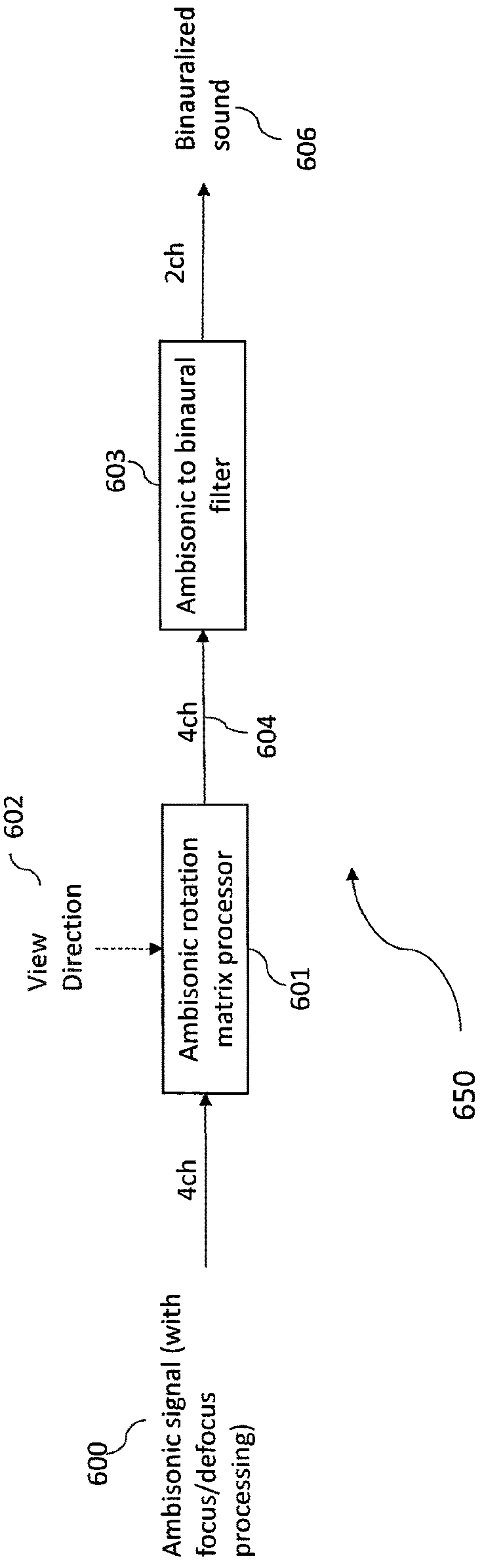
FIGS. 6*a* and 6*b* show schematically an example reproduction processor as shown in FIG. 2*a* with a higher order ambisonic audio signal input and method of operating the example reproduction processor according to some embodiments.

With respect to FIG. 6*a* is shown an example of the reproduction processor 650 based on the Ambisonic audio input (for example which may be configured to receive the output from the example focus processor as shown in FIG. 3*a*).

In these examples reproduction processor may comprise an Ambisonic rotation matrix processor 601. The Ambisonic rotation matric processor 601 is configured to receive the Ambisonic signal with focus/defocus processing 600 and the view direction 602. The Ambisonic rotation matrix processor 601 is configured to generate a rotation matrix based on the view direction parameter 602. This may in some embodiments use any suitable method, such as those applied in head-tracked Ambisonic binauralization (or more generally, such rotation of spherical harmonics is used in many fields, including other than audio). The rotation matrix then be applied to the Ambisonic audio signals. The result of which are rotated Ambisonic signals with added focus/defocus 604, which are output to an Ambisonic to binaural filter 603.

The Ambisonic to binaural filter 603 is configured to receive the rotated Ambisonic signals with added focus/defocus 604. The Ambisonic to binaural filter 603 may comprise a pre-formulated 2×K matrix of finite impulse response (FIR) filters that are applied to the KAmbisonic signals to generate the 2 binaural signals 606. In this example where 4 channels FOA audio signals are shown then K=4. The FIR filters may be generated by a least-squares optimization method with respect to a set of head-related impulse responses (HRIRs). An example of such a design procedure is to transform the HRIR data set to frequency bins (for example by FFT) to obtain the HRTF data set, and to determine for each frequency bin a complex-valued processing matrix that in a least-squares sense approximates the available HRTF data set at the data points of the HRTF data set. When for all frequency bins the complex valued matrices are determined in such a way, the result can be inverse transformed (for example by inverse FFT) as time-domain FIR filters. The FIR filters may also be windowed, for example by using a Hann window.

In some embodiments the rendering is not to headphones but to loudspeakers. There are many known methods which may be used to render an Ambisonic signal to loudspeaker output. One example may be a linear decoding of the Ambisonic signals to a target loudspeaker configuration. This may be applied with a good expected spatial fidelity when the order of the Ambisonic signals is sufficiently high, for example, at least $3^{rd}$ order, but preferably $4^{th}$ order. In a specific example of such linear decoding an Ambisonic decoding matrix may be designed that, when applied to the Ambisonic signals (corresponding to Ambisonic beam patterns), generates loudspeaker signals corresponding to beam patterns that in a least-square sense approximate the vector-base amplitude panning (VBAP) beam patterns suitable for the target loudspeaker configuration. Processing the Ambisonic signals with such a designed Ambisonic decoding matrix may be configured to generate the loudspeaker sound output. In such embodiments the reproduction processor is configured to receive information regarding the loudspeaker configuration, and no rotation processing is needed.

Figure 6B:
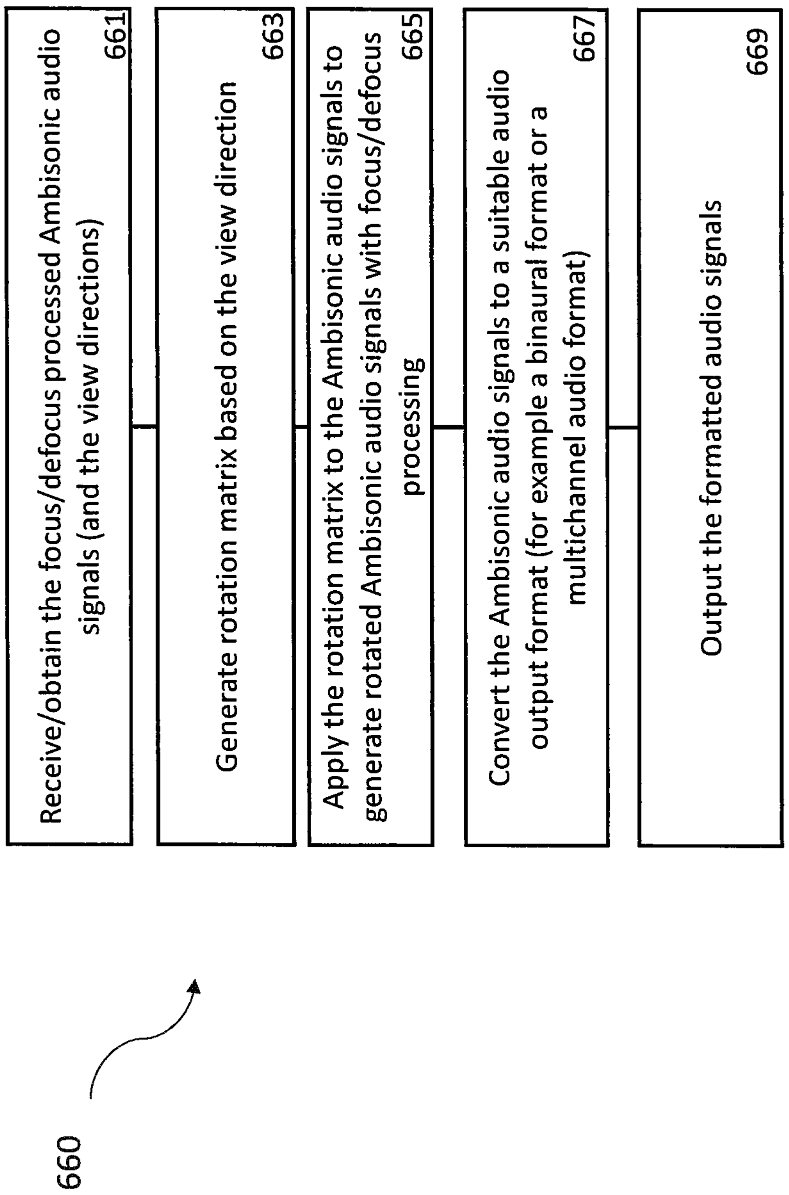

With respect to FIG. 6*b* is shown a flow diagram 660 of the operation of the Ambisonic input reproduction processor as shown in FIG. 6*a*.

The initial operation is receiving the focus/defocus processed Ambisonic audio signals (and the view directions) as shown in FIG. 6*b* by step 661.

The next operation is one of generating a rotation matrix based on the view direction as shown in FIG. 6*b* by step 663.

The next operation is applying the rotation matrix to the Ambisonic audio signals to generate rotated Ambisonic audio signals with focus/defocus processing as shown in FIG. 6*b* by step 665.

Then the next operation is converting the Ambisonic audio signals to a suitable audio output format, for example a binaural format (or a multichannel audio format or loudspeaker format) as shown in FIG. 6*b* by step 667.

Then the output audio format is then output as shown in FIG. 6*b* by step 669.

Figure 7A:
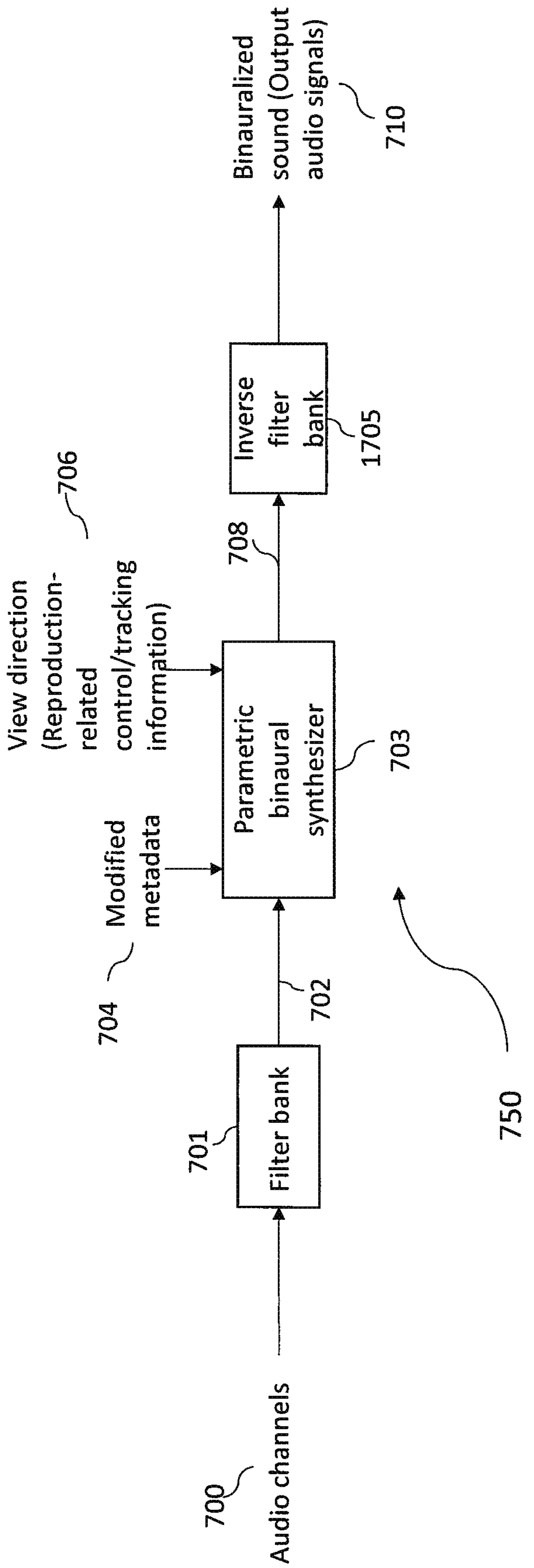
FIGS. 7*a* and 7*b* show schematically an example reproduction processor as shown in FIG. 2*a* with a parametric spatial audio signal input and method of operating the example reproduction processor according to some embodiments.

With respect to FIG. 7*a* is shown an example of the reproduction processor 750 based on the parametric spatial audio input (for example which may be configured to receive the output from the example focus processor as shown in FIG. 4*a*).

In some embodiments the reproduction processor comprises a filter bank 701 configured to receive the audio channels 700 audio signals and transform the audio channels to frequency bands (unless the input is already in a suitable time-frequency domain). Examples of suitable filter banks include the short-time Fourier transform (STFT) and the complex quadrature mirror filter (QMF) bank. The time-frequency audio signals 702 can be output to a parametric binaural synthesizer 703.

In some embodiments the reproduction processor comprises a parametric binaural synthesizer 703 configured to receive the time-frequency audio signals 702 and the modified (and unmodified) metadata 704 and also the view direction 706 (or suitable reproduction related control or tracking information). In context of 6DOF reproduction, the user position may be provided along with the view direction parameter.

The parametric binaural synthesizer 703 may be configured to implement any suitable known parametric spatial synthesis method configured to generate a binaural audio signal (in frequency bands) 708, since the focus modification has taken place already for the signals and the metadata before the parametric binauralization block. One known method for parametric binaural synthesis is to divide the time-frequency audio signals 702 into direct and ambient part signals in frequency bands based on the direct-to-total ratio parameter in frequency bands, processing the direct part in frequency bands with HRTFs corresponding to the direction parameter in frequency bands, processing the ambient part with decorrelators to obtain a binaural diffuse field coherence, and combining the processed direct and ambient parts. The binaural audio signal (in frequency bands) 708 has then two channels, regardless of how many channels the time-frequency audio signals 702 have. The binauralized time-frequency audio signals 708 can then be passed to an inverse filter bank 705. The embodiments may further feature the reproduction processor comprising an inverse filter bank 705 configured to receive the binauralized time-frequency audio signals 708 and apply an inverse to the applied forward filter bank thus generate a time domain binauralized audio signal 710 with the focus characteristics suitable for reproduction by headphones (not shown in FIG. 7*a*).

In some embodiments the binaural audio signal output is replaced by a loudspeaker channel audio signals output format from the parametric spatial audio signals using suitable loudspeaker synthesis methods. Any suitable approach may be used, for example one where the view direction parameter is replaced with information of the positions of the loudspeakers, and the parametric binaural synthesizer 703 is replaced with a parametric loudspeaker synthesizer, based on suitable known methods. One known method for parametric loudspeaker synthesis is to divide the time-frequency audio signals 702 into direct and ambient part signals in frequency bands based on the direct-to-total ratio parameter in frequency bands, processing the direct part in frequency bands with vector-base amplitude panning (VBAP) gains corresponding to the loudspeaker configuration and the direction parameter in frequency bands, processing the ambient part with decorrelators to obtain incoherent loudspeaker signals, and combining the processed direct and ambient parts. The loudspeaker audio signal (in frequency bands) has then the number of channels determined by the loudspeaker configuration, regardless of how many channels the time-frequency audio signals 702 have.

Figure 7B:
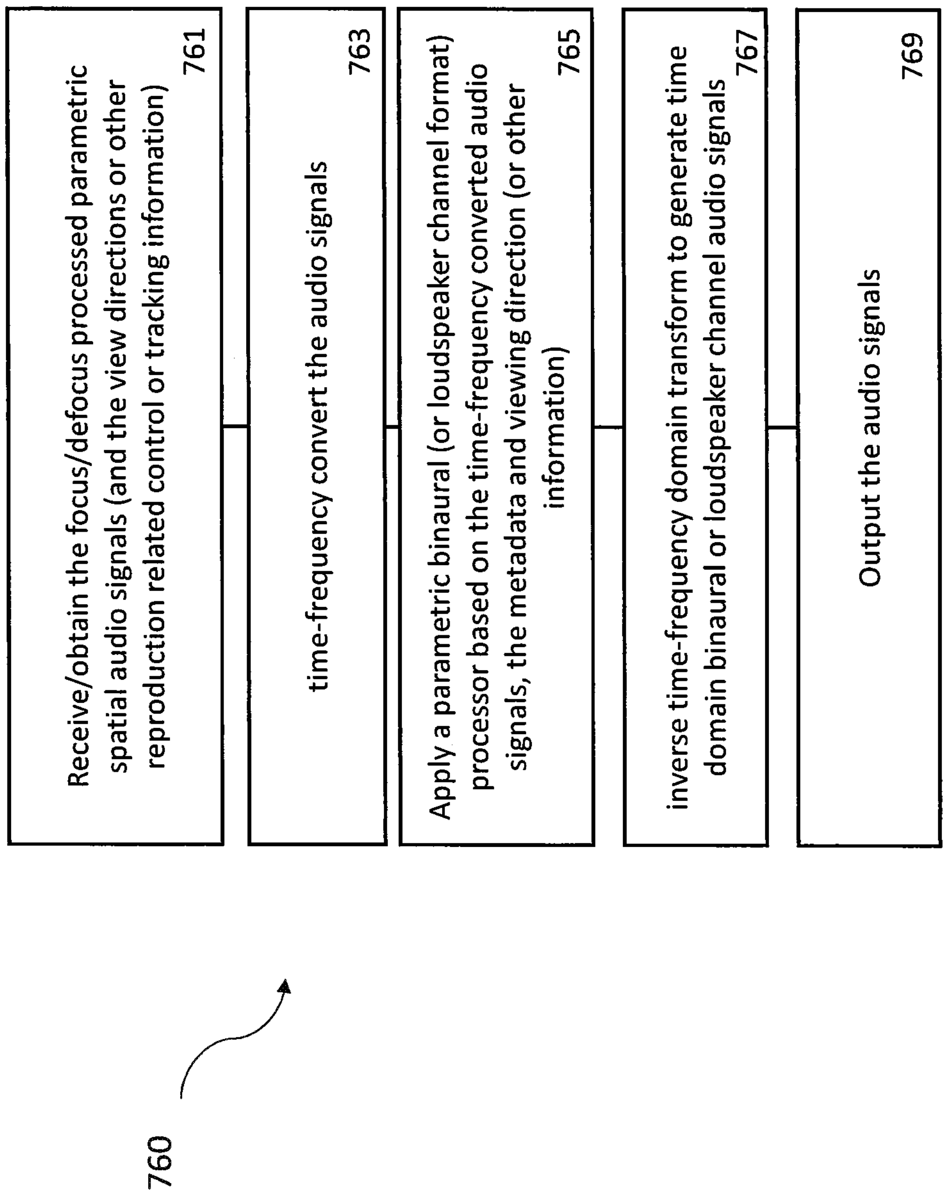

With respect to FIG. 7*b* is shown a flow diagram 760 of the operation of the parametric spatial audio input reproduction processor as shown in FIG. 7*a*.

The initial operation is receiving the focus/defocus processed parametric spatial audio signals (and the view directions or other reproduction related control or tracking information) as shown in FIG. 7*b* by step 761.

The next operation is one of time-frequency converting the audio signals as shown in FIG. 7*b* by step 763.

The next operation is applying a parametric binaural (or loudspeaker channel format) processor based on the time-frequency converted audio signals, the metadata and viewing direction (or other information) as shown in FIG. 7*b* by step 765.

Then the next operation is inverse transforming the generated binaural or loudspeaker channel audio signals as shown in FIG. 7*b* by step 767.

Then the output audio format is then output as shown in FIG. 7*b* by step 769.

Considering a loudspeaker output for the reproduction processor when the audio signal is in a form of multichannel audio and focus processor 550 in FIG. 5*a* is applied, then in some embodiments the reproduction processor may comprise a pass-through where the output loudspeaker configuration is the same as the format of the input signal. In some embodiments where the output loudspeaker configuration differs from the input loudspeaker configuration, reproduction processor may comprise a vector-base amplitude panning (VBAP) processor. Each of the focus-processed audio channels can then be processed using VBAP, a known amplitude panning technique, to spatially reproduce them using the target loudspeaker configuration. The output audio signal is thus matched to the output loudspeaker setup.

In some embodiments the conversion from the first loudspeaker configuration to the second loudspeaker configuration may be implemented using any suitable amplitude panning technique. For example an amplitude panning technique may comprise deriving a N-by-M matrix of amplitude panning gains that define conversion from a M channels of the first loudspeaker configuration to a N channels of the second loudspeaker configuration and then use the matrix to multiply the channels of an intermediate spatial audio signal provided as a multi-channel loudspeaker signal according to the first loudspeaker configuration. The intermediate spatial audio signal may be understood to be similar to the audio signal with a focused/defocussed sound component 204 as shown in FIG. 2*a*. As a non-limiting example, derivation of VBAP amplitude panning gains is provided in Pulkki, Ville: "*Virtual sound source positioning using vector base amplitude panning*", Journal of the audio engineering society 45, no. 6 (1997), pp. 456-466.

For binaural output any suitable binauralization of a multi-channel loudspeaker signal format (and/or objects) may be implemented. For example a typical binauralization may comprise processing the audio channels with head-related transfer functions (HRTFs) and adding synthetic room reverberation to generate an auditory impression of a listening room. The distance+directional (i.e., positional) information of the audio object sounds can be utilized for the 6DOF reproduction with user movement, by adopting the principles outlined for example in GB patent application GB1710085.0.

Figure 8:
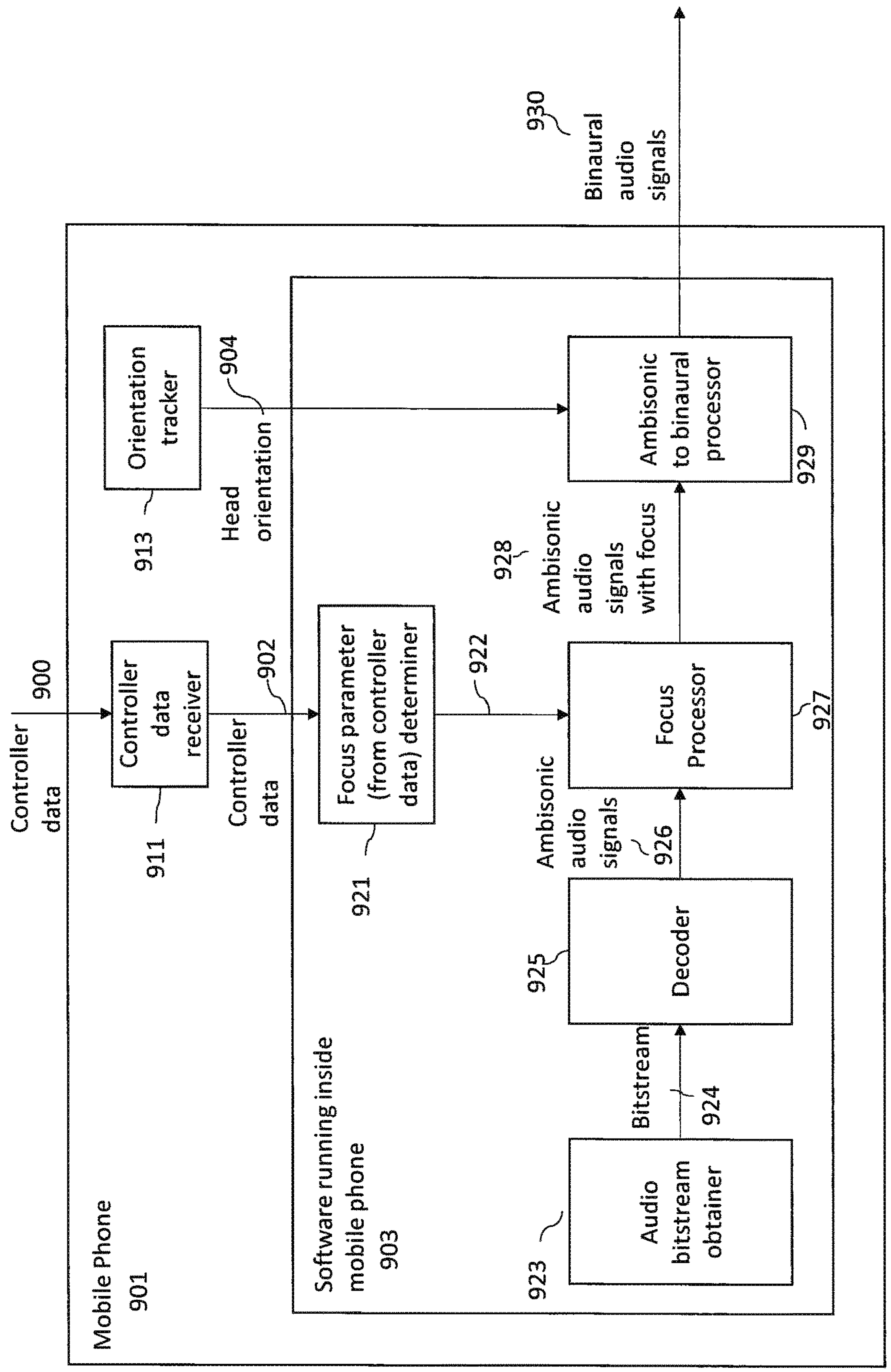
FIG. 8 shows an example implementation of some embodiments.

An example apparatus suitable for implementation is shown in FIG. 8 in the form of a mobile phone or mobile device 901 running suitable software 903. The video could be reproduced, for example, by attaching the mobile phone 901 to a Daydream view type device (although for clarity video processing is not discussed here).

An audio bitstream obtainer 923 is configured to obtain an audio bitstream 924, for example being received/retrieved from storage. In some embodiments the mobile device comprises a decoder 925 configured to receive compressed audio and decode it. Examples of the decoder is an AAC decoder in the case of AAC decoding. The resulting decoded (for example Ambisonic where the example implements the examples as shown in FIGS. 3*a* and 6*a*) audio signals 926 can be forwarded to the focus processor 927.

The mobile phone 901 receives controller data 900 (for example via Bluetooth) from an external controller at a controller data receiver 911 and passes that data to the focus parameter (from controller data) determiner 921. The focus parameter (from controller data) determiner 921 determines the focus parameters, for example based on the orientation of the controller device and/or button events. The focus parameters can comprise any kind of combination of the proposed focus parameters (e.g., focus/defocus direction, focus/defocus amount, focus/defocus height, and focus/defocus width). The focus parameters 922 are forwarded to the focus processor 927.

Based on the Ambisonic audio signals and focus parameters a focus processor 927 is configured to create modified Ambisonic signals 928 that have desired focus characteristics. These modified Ambisonic signals 928 are forwarded to the Ambisonic to binaural processor 929. The Ambisonic to binaural processor 929 also is configured to receive head orientation information 904 from the orientation tracker 913 of the mobile phone 901. Based on the modified Ambisonic signals 928 and the head orientation information 904, the ambisonic to binaural processor 929 is configured to create head-tracked binaural signals 930 which can be outputted from the mobile phone, and played back using, e.g., headphones.

Figure 9:
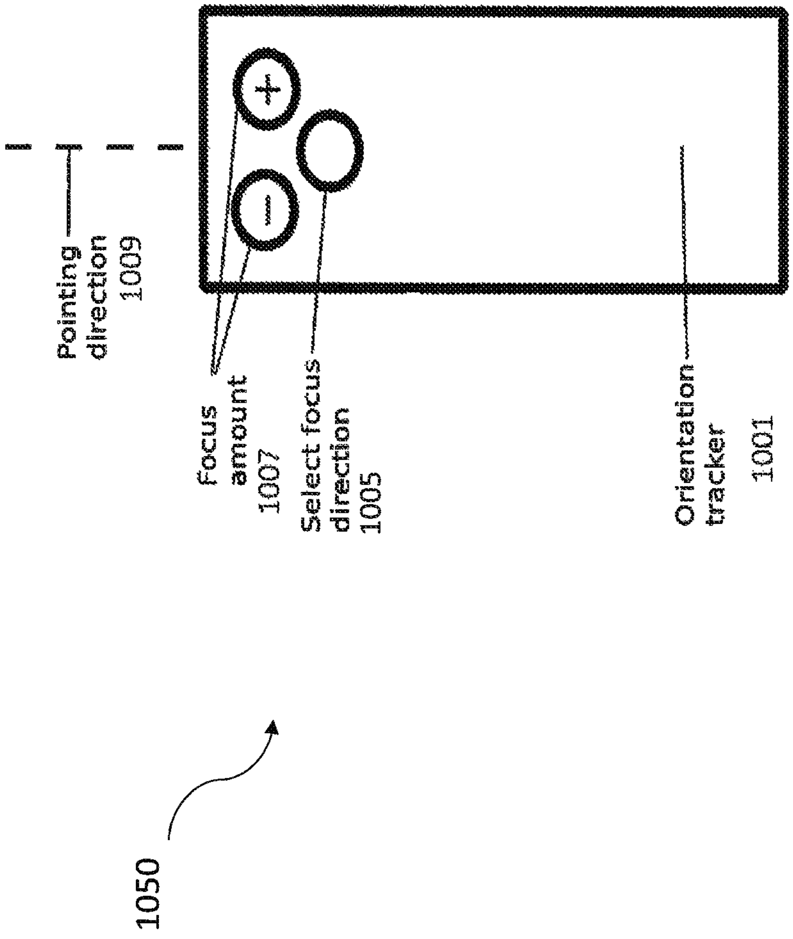
FIG. 9 shows an example controller for controlling focus direction, focus amount and focus width according to some embodiments.

FIG. 9 shows an example apparatus (or focus/defocus parameter controller) 1050 which may be configured to control or generate suitable focus/defocus parameters such as focus/defocus direction, focus/defocus amount, and focus/defocus width. A user of the apparatus can be configured to select the focus direction by pointing the controller to a desired direction 1009 and pressing a select focus direction button 1005. The controller has an orientation tracker 1001, and the orientation information may be used for determining the focus/defocus direction (e.g., in the focus parameters (from controller data) determiner 921 as shown in FIG. 8). The focus/defocus direction in some embodiments may be visualized in a visual display while selecting the focus/defocus direction.

In some embodiments the focus amount can be controlled using Focus amount buttons (shown in FIGS. 9 as + and −) 1007. Each press increases/decreases the focus amount by an amount, for example 10 percentage points. In some embodiments when the focus amount is set to 0%, and the user presses the minus button, the focus amount is set to 10%, and the focus/de-focus control is set to "de-focus" mode. Correspondingly, if the focus amount is set to 0%, and the user presses the plus button, the focus amount is set to 10%, and the focus/de-focus control is set to "focus" mode.

In some embodiments, it may be desirable to further specify the focus or defocus processing, for example by determining a desired frequency range or spectral property of the focused signal. In particular, it may be useful to emphasize or de-emphasize the audio spectrum at the speech frequency range to improve the intelligibility or to block talker, for example in focusing by attenuating low frequency content (for example, below 200 Hz), and the high-frequency content (for example, above 8 kHz), thus leaving a particularly useful frequency range related to speech.

Similarly when the user indicates a direction that is to be de-focused, the audio processing system could analyse the spectrum or type (e.g., speech, noise) of the interferer at the direction to be attenuated. Then, based on this analysis, the system could determine a frequency range or de-focus amount per frequency that is well suited for that interferer. For example, the interferer may be a device generating high-frequency noise, and high frequencies for that de-focus direction would be attenuated more than for example the middle and low frequencies. In another example, the de-focus direction has a talker, and therefore the de-focus amount could be configured per frequency to suppress mostly the typical speech frequency range.

It is understood that the focus-processed signal may be further processed with any known audio processing techniques, such as automatic gain control or enhancement techniques (e.g. bandwidth extension, noise suppression). In some further embodiments, the focus/defocus parameters (including the direction, the amount and control) are generated by a content creator, and the parameters are sent alongside the spatial audio signal. For example in a VR video/audio nature documentary with an on-site commentator, instead of a user needing to select the direction of the commentator to be defocused, a dynamic focus parameter pre-set can be selected. The pre-set may have been fine-tuned by the content creator to follow the movement of the commentator. For example the de-focus is enabled only when the commentator speaks. In other words, the content creator can generate some expected or estimated preference profiles as the focus/de-focus parameters. The approach is beneficial since only one spatial audio signal needs to be conveyed, but different preference profiles can be added. A legacy player not enabled with focus can then be configured to simply decode the Ambisonic or other signal type without applying focus/de-focus processing.

Figure 10:
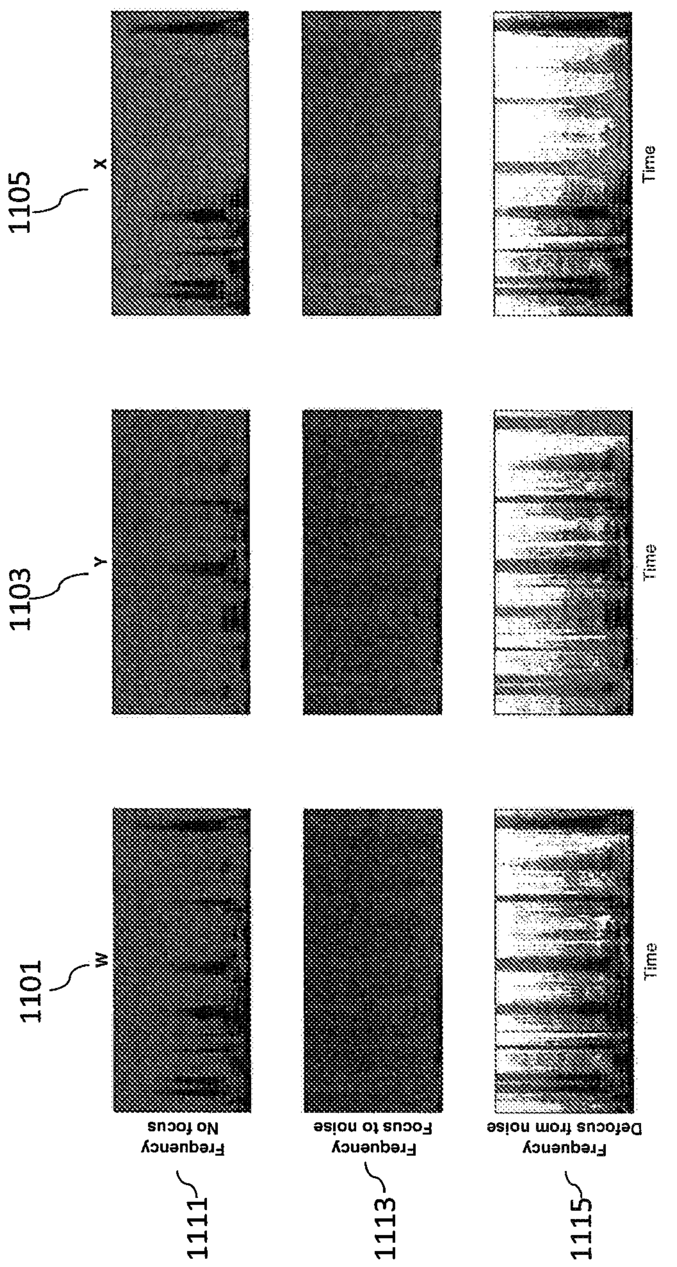
FIG. 10 shows an example processing output based on processing the higher order Ambisonics audio signals according to some embodiments.

An example processing output is shown in FIG. 10 based on the implementation described for Ambisonic signals. In this example three sound sources are within the audio scene: a talker at front, a talker at −90 degrees right, and a white noise interferer at 110 degrees left. The FIG. 10 shows how the focus processing, with the focus/defocus control set to "focus", is utilized to extensively emphasize the direction where the noise source resides, and how focus processing, with the focus/defocus control set to "defocus", is utilized to extensively de-emphasize the direction where the noise source resides while preserving the two talker signals at the spatial audio output. Thus Ambisonic signals are shown in 3 columns (omni W 1101, horizontal dipoles Y 1103 and X 1105) in an example situation shown by the Ambisonics signal in row 1111 with a talker at front (shown particularly at signal X), a talker at −90 degrees right (shown particularly at signal Y), and a noise interferer at 110 degrees left (shown at all signals). The following row 1113 shows the Ambisonics audio signals where there is full focus processing towards the noise source. The bottom row 1115 shows the Ambisonics audio signals with full de-focus processing towards the noise source (i.e., de-emphasizing the noise), leaving mostly the speech sources active.

Figure 11:
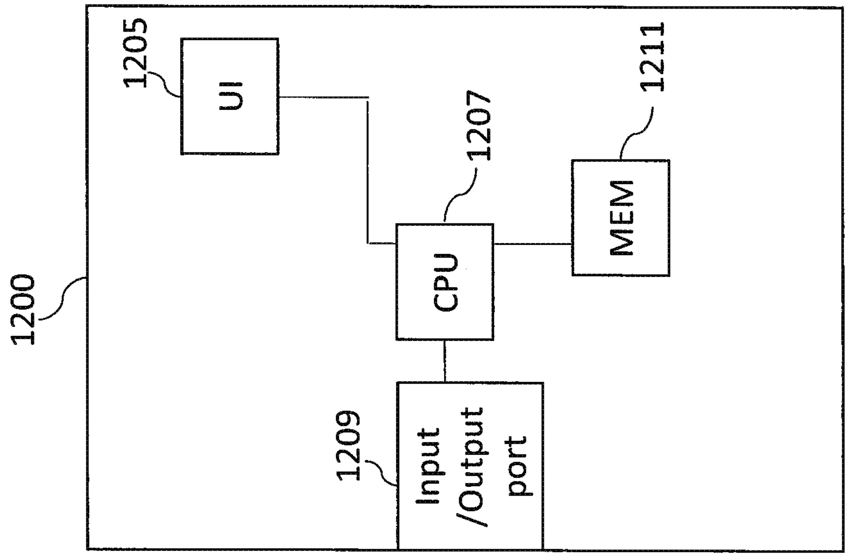
FIG. 11 shows an example device suitable for implementing the apparatus shown.

With respect to FIG. 11 an example electronic device which may be used as the analysis or synthesis device is shown. The device may be any suitable electronics device or apparatus. For example in some embodiments the device 1700 is a mobile device, user equipment, tablet computer, computer, audio playback apparatus, etc.

In some embodiments the device 1200 comprises at least one processor or central processing unit 1207. The processor 1207 can be configured to execute various program codes such as the methods such as described herein.

In some embodiments the device 1200 comprises a memory 1211. In some embodiments the at least one processor 1207 is coupled to the memory 1211. The memory 1211 can be any suitable storage means. In some embodiments the memory 1211 comprises a program code section for storing program codes implementable upon the processor 1207. Furthermore in some embodiments the memory 1211 can further comprise a stored data section for storing data, for example data that has been processed or to be processed in accordance with the embodiments as described herein. The implemented program code stored within the program code section and the data stored within the stored data section can be retrieved by the processor 1207 whenever needed via the memory-processor coupling.

In some embodiments the device 1200 comprises a user interface 1205. The user interface 1205 can be coupled in some embodiments to the processor 1207.

In some embodiments the processor 1207 can control the operation of the user interface 1205 and receive inputs from the user interface 1205. In some embodiments the user interface 1205 can enable a user to input commands to the device 1200, for example via a keypad. In some embodiments the user interface 1205 can enable the user to obtain information from the device 1200. For example the user interface 1205 may comprise a display configured to display information from the device 1200 to the user. The user interface 1205 can in some embodiments comprise a touch screen or touch interface capable of both enabling information to be entered to the device 1200 and further displaying information to the user of the device 1200.

In some embodiments the device 1200 comprises an input/output port 1209. The input/output port 1209 in some embodiments comprises a transceiver. The transceiver in such embodiments can be coupled to the processor 1207 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802. X, a suitable short-range radio frequency communication protocol such as Bluetooth, or infrared data communication pathway (IRDA).

The transceiver input/output port 1209 may be configured to receive the signals and in some embodiments obtain the focus parameters as described herein.

In some embodiments the device 1200 may be employed to generate a suitable audio signal by using the processor 1207 executing suitable code. The input/output port 1209 may be coupled to any suitable audio output for example to a multichannel speaker system and/or headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:

at least one processor; and at least one memory storing instructions that, when executed with the at least one processor, cause the apparatus at least to:

obtain a defocus direction;

obtain a defocus amount;

process a spatial audio signal that represents an audio scene, using the defocus direction and the defocus amount, to generate a processed spatial audio signal that represents a modified audio scene, so as to control relative deemphasis in, at least in part, a portion of the spatial audio signal in the defocus direction relative to at least in part other portions of the spatial audio signal according to the defocus amount; and output the processed spatial audio signal, wherein the modified audio scene comprises the controlled deemphasis in the defocus direction according to the defocus amount.

2. The apparatus according to claim 1, wherein processing the spatial audio signal comprises the instructions, when executed with the at least one processor, cause the apparatus to at least one of:

decrease emphasis in, at least in part, the portion of the spatial audio signal in the defocus direction relative to at least in part the other portions of the spatial audio signal; or increase emphasis in, at least in part, the other portions of the spatial audio signal relative to the portion of the spatial audio signal in the defocus direction.

3. The apparatus according to claim 1, wherein processing the spatial audio signal comprises the instructions, when executed with the at least cause the one processor, apparatus to at least one of:

decrease a sound level in, at least in part, the portion of the spatial audio signal in the defocus direction according to the defocus amount relative to at least in part the other portions of the spatial audio signal; or increase a sound level in, at least in part, the other portions of the spatial audio signal relative to the portion of the spatial audio signal in the defocus direction according to the defocus amount.

4. The apparatus according to claim 1, wherein the at least one memory stores instructions that, when executed with the at least one processor, cause the apparatus to:

obtain a defocus shape, and wherein processing the spatial audio signal comprises the instructions, when executed with the at least one processor, cause the apparatus to:

control the relative deemphasis in, at least in part, the portion of the spatial audio signal in the defocus direction and within the defocus shape relative to at least in part the other portions of the spatial audio signal.

5. The apparatus according to claim 4, wherein processing the spatial audio signal comprises the instructions, when executed with the at least one processor, cause the apparatus to at least one of:

decrease emphasis in, at least in part, the portion of the spatial audio signal in the defocus direction and within the defocus shape relative to at least in part the other portions of the spatial audio signal; or increase emphasis in, at least in part, the other portions of the spatial audio signal relative to the portion of the spatial audio signal in the defocus direction and within the defocus shape.

6. The apparatus according to claim 4, wherein processing the spatial audio signal comprises the instructions, when executed with the at least one processor, cause the apparatus to at least one of:

decrease a sound level in, at least in part, the portion of the spatial audio signal in the defocus direction and within the defocus shape according to the defocus amount relative to at least in part the other portions of the spatial audio signal; or increase a sound level in, at least in part, the other portions of the spatial audio signal relative to the portion of the spatial audio signal in the defocus direction and within the defocus shape according to the defocus amount.

7. The apparatus according to claim 1, wherein the at least one memory stores instructions that, when executed with the at least one processor, cause the apparatus to:

obtain reproduction control information to control at least one aspect of outputting the processed spatial audio signal, and wherein outputting the processed spatial audio signal comprises the instructions, when executed with the at least one processor, cause the apparatus to one of:

process the processed spatial audio signal to generate an output spatial audio signal in accordance with the reproduction control information; or process the spatial audio signal in accordance with the reproduction control information prior to processing the spatial audio signal to generate the processed spatial audio signal.

8. The apparatus according to claim 1, wherein the spatial audio signal and the processed spatial audio signal comprise respective Ambisonic signals and wherein processing the spatial audio signal comprises the instructions, when executed with the at least one processor, cause the apparatus, for one or more frequency sub-bands, to at least one of:

extract, from the spatial audio signal, a single channel target audio signal that represents a sound component arriving from the defocus direction; or generate a focused spatial audio signal, wherein the focused spatial audio signal is arranged in a spatial position defined with the defocus direction; and create the processed spatial audio signal as a linear combination of the focused spatial audio signal subtracted from the spatial audio signal, wherein at least one of the focused spatial audio signal or the spatial audio signal is scaled with a respective scaling factor derived on basis of the defocus amount to decrease a relative level of sound in the defocus direction.

9. The apparatus according to claim 8, wherein extracting the single channel target audio signal comprises the instructions, when executed with the at least one processor, cause the apparatus to at least one of:

apply a beamformer to derive, from the spatial audio signal, a beamformed signal that represents the sound component arriving from the defocus direction; or apply a post filter to derive the processed spatial audio signal on basis of the beamformed signal, thereby adjusting a spectrum of the beamformed signal to approximate a spectrum of the sound arriving from the defocus direction.

10. The apparatus according to claim 1, wherein the spatial audio signal and the processed spatial audio signal comprise respective parametric spatial audio signals, wherein the parametric spatial audio signals respectively comprise one or more audio channels and spatial metadata, wherein the spatial metadata comprises a respective direction indication and an energy ratio parameter for a plurality of frequency sub-bands, wherein processing the spatial audio signal comprises the instructions, when executed with the at least one processor, cause the apparatus to:

compute, for one or more frequency sub-bands, a respective angular difference between the defocus direction and the direction indicated for the respective frequency sub-band of the spatial audio signal;

derive a respective gain value for the one or more frequency sub-bands on basis of the angular difference computed for the respective frequency sub-band using a predefined function of angular difference and a scaling factor derived on basis of the defocus amount;

compute, for one or more frequency sub-bands of the processed spatial audio signal, a respective updated directional energy value on basis of the energy ratio parameter of the respective frequency sub-band of the spatial audio signal and the gain value;

compute, for the one or more frequency sub-bands of the processed spatial audio signal, a respective updated ambient energy value on basis of the energy ratio parameter of the respective frequency sub-band of the spatial audio signal and the scaling factor;

compute a respective modified energy ratio parameter for the one or more frequency sub-bands of the processed spatial audio signal on basis of the updated directional energy value divided by a sum of the updated directional and ambient energy values;

compute a respective spectral adjustment factor for the one or more frequency sub-bands of the processed spatial audio signal on basis of the sum of the updated directional and ambient energy values; and compose the processed spatial audio signal comprising the one or more audio channels of the spatial audio signal, the direction indications of the spatial audio signal, the modified energy ratio parameters, and the spectral adjustment factors.

11. The apparatus according to claim 1, wherein the spatial audio signal and the processed spatial audio signal comprise respective parametric spatial audio signals, wherein the parametric spatial audio signals comprise one or more audio channels and spatial metadata, the wherein spatial metadata comprises a respective direction indication and an energy ratio parameter for a plurality of frequency sub-bands, wherein processing the spatial audio signal comprises the instructions, when executed with the at least one processor, cause the apparatus to:

compute, for one or more frequency sub-bands, a respective angular difference between the defocus direction and the direction indicated for a respective frequency sub-band of the spatial audio signal;

derive a respective gain value for the one or more frequency sub-bands on basis of the angular difference computed for the respective frequency sub-band using a predefined function of angular difference and a scaling factor derived on basis of the defocus amount;

compute, for one or more frequency sub-bands of the processed spatial audio signal, a respective updated directional energy value on basis of the energy ratio parameter of the respective frequency sub-band of the spatial audio signal and the gain value;

compute, for the one or more frequency bands of the processed spatial audio signal, a respective updated ambient energy value on basis of the energy ratio parameter of the respective frequency sub-band of the spatial audio signal and the scaling factor;

compute a respective modified energy ratio parameter for the one or more frequency sub-bands of the processed spatial audio signal on basis of the updated directional energy value divided by a sum of the updated directional and ambient energy values;

compute a respective spectral adjustment factor for the one or more frequency sub-bands of the processed spatial audio signal on basis of the sum of the updated directional and ambient energy values;

derive in the one or more frequency sub-bands, one or more enhanced audio channels with multiplying a respective frequency band of a respective one of the one more audio channels of the spatial audio signal by the spectral adjustment factor computed for the respective frequency sub-band; and compose the processed spatial audio signal comprising the one or more enhanced audio channels, the direction indications of the spatial audio signal, and the modified energy ratio parameters.

12. The apparatus according to claim 1, wherein the spatial audio signal and the processed spatial audio signal comprise respective multi-channel loudspeaker signals according to a first predefined loudspeaker configuration, and wherein processing the spatial audio signal comprises the instructions, when executed with the at least one processor, cause the apparatus to:

compute a respective angular difference between the defocus direction and a loudspeaker direction indicated for a respective channel of the spatial audio signal;

derive a respective gain value for respective channels of the spatial audio signal on basis of the angular difference computed for the respective channel using a predefined function of angular difference and a scaling factor derived on basis of the defocus amount;

derive one or more modified audio channels with multiplying the respective channel of the spatial audio signal by the gain value derived for the respective channel; and provide the one or more modified audio channels as the processed spatial audio signal.

13. A apparatus according to claim 7, wherein the processed spatial audio signal comprises an Ambisonic signal and the output spatial audio signal comprises a two-channel binaural signal, wherein the reproduction control information comprises an indication of a reproduction orientation that defines a listening direction with respect to the audio scene, and wherein processing the processed spatial audio signal to generate the output spatial audio signal in accordance with the reproduction control information comprises the instructions, when executed with the at least one processor, cause the apparatus to:

generate a rotation matrix based, at least partially, on the indicated reproduction orientation;

multiply channels of the processed spatial audio signal with the rotation matrix to derive a rotated spatial audio signal;

filter channels of the rotated spatial audio signal using a predefined set of finite impulse response filter pairs generated on basis of a data set of head related impulse response functions, or head related impulse responses; and generate left and right channels of the two-channel binaural signal as a sum of the filtered channels of the rotated spatial audio signal derived for the respective ones of the left and right channels.

14. The apparatus according to claim 7, wherein the output spatial audio signal comprises a two-channel binaural audio signal, wherein the reproduction control information comprises an indication of a reproduction orientation that defines a listening direction with respect to the audio scene, and wherein processing the processed spatial audio signal to generate the output spatial audio signal in accordance with the reproduction control information comprises the instructions, when executed with the at least one processor, cause the apparatus to:

derive, in one or more frequency sub-bands, one or more enhanced audio channels with multiplying a respective frequency sub-band of a respective one of one more audio channels of the processed spatial audio signal by a spectral adjustment factor received for the respective frequency sub-band; and convert the one or more enhanced audio channels into the two-channel binaural audio signal in accordance with the indicated reproduction orientation.

15. The apparatus according to claim 7, wherein the output spatial audio signal comprises a two-channel binaural signal, wherein the reproduction control information comprises an indication of a reproduction orientation that defines a listening direction with respect to the audio scene, and wherein processing the processed spatial audio signal to generate the output spatial audio signal in accordance with the reproduction control information comprises the instructions, when executed with the at least one processor, cause the apparatus to:

select a set of head related transfer functions, in dependence of the indicated reproduction orientation; and convert channels of the processed spatial audio signal into the two-channel binaural audio signal that conveys a rotated audio scene using the selected set of head related transfer functions.

16. The apparatus according to claim 7, wherein the reproduction control information comprises an indication of a second predefined loudspeaker configuration and the output spatial audio signal comprises multi-channel loudspeaker signals according to the second predefined loudspeaker configuration, and wherein processing the processed spatial audio signal to generate the output spatial audio signal in accordance with the reproduction control information comprises the instructions, when executed with the at least one processor, cause the apparatus to:

derive channels of the output spatial audio signal on basis of the processed spatial audio signal using amplitude panning, comprising the instructions, when executed with the at least one processor, cause the apparatus to:

derive a conversion matrix including amplitude panning gains that provide a mapping from a first predefined loudspeaker configuration to the second predefined loudspeaker configuration; and use the conversion matrix to multiply channels of the processed spatial audio signal into the channels of the output spatial audio signal.

17. The apparatus according to claim 4, wherein the defocus shape comprises at least one of:

a defocus shape width;

a defocus shape height;

a defocus shape radius;

a defocus shape distance;

a defocus shape depth;

a defocus shape range;

a defocus shape diameter; or a defocus shape characterizer.

18. The apparatus according to claim 1, where the at least one memory stores instructions that, when executed with the at least one processor, cause the apparatus to:

obtain a defocus input from a sensor arrangement that comprises at least one direction sensor and at least one user input, wherein the defocus input comprises at least one of:

an indication of the defocus direction based on at least one direction sensor direction;

an indicator of the defocus amount based on the at least one user input; or an indicator of the obtained defocus shape.

19. A method comprising:

obtaining a defocus direction;

obtaining a defocus amount;

processing a spatial audio signal that represents an audio scene, using the defocus direction and the defocus amount, to generate a processed spatial audio signal that represents a modified audio scene, so as to control relative deemphasis in, at least in part, a portion of the spatial audio signal in the defocus direction relative to at least in part other portions of the spatial audio signal according to the defocus amount; and outputting the processed spatial audio signal, wherein the modified audio scene comprises the controlled deemphasis in the defocus direction according to the defocus amount.

20. A non-transitory computer-readable medium comprising program instructions stored thereon for performing at least the following:

obtaining a defocus direction;

obtaining a defocus amount;

processing a spatial audio signal that represents an audio scene, using the defocus direction and the defocus amount, to generate a processed spatial audio signal that represents a modified audio scene, so as to control relative deemphasis in, at least in part, a portion of the spatial audio signal in the defocus direction relative to at least in part other portions of the spatial audio signal according to the defocus amount; and causing outputting of the processed spatial audio signal, wherein the modified audio scene comprises the controlled deemphasis in the defocus direction relative according to the defocus amount.

* * * * *